Dec. 29, 1953 R. M. M. OBERMAN 2,664,459

AUTOMATIC SWITCHING MEANS FOR USE IN TELEGRAPH SYSTEMS AND THE LIKE

Filed Oct. 2, 1951 13 Sheets-Sheet 1

INVENTOR.
ROELOF MAARTEN MARIE OBERMAN
BY
[signature]
agt

Dec. 29, 1953 R. M. M. OBERMAN 2,664,459

AUTOMATIC SWITCHING MEANS FOR USE IN TELEGRAPH SYSTEMS AND THE LIKE

Filed Oct. 2, 1951 13 Sheets-Sheet 2

INVENTOR.
ROELOF MAARTEN MARIE OBERMAN
BY

Dec. 29, 1953

R. M. M. OBERMAN

AUTOMATIC SWITCHING MEANS FOR USE IN TELEGRAPH SYSTEMS AND THE LIKE 2,664,459

Filed Oct. 2, 1951

13 Sheets-Sheet 3

INVENTOR.
ROELOF MAARTEN MARIE OBERMAN
BY Michael S. Striker
agt

INVENTOR.
ROELOF MAARTEN MARIE OBERMAN
BY

Dec. 29, 1953 R. M. M. OBERMAN 2,664,459

AUTOMATIC SWITCHING MEANS FOR USE IN TELEGRAPH SYSTEMS AND THE LIKE

Filed Oct. 2, 1951 13 Sheets-Sheet 5

INVENTOR.
ROELOF MAARTEN MARIE OBERMAN
BY [signature] agt

Dec. 29, 1953

R. M. M. OBERMAN

AUTOMATIC SWITCHING MEANS FOR USE IN TELEGRAPH SYSTEMS AND THE LIKE 2,664,459

Filed Oct. 2, 1951

13 Sheets-Sheet 6

INVENTOR.
ROELOF MAARTEN MARIE OBERMAN
BY
[signature]
agt

Dec. 29, 1953 R. M. M. OBERMAN 2,664,459

AUTOMATIC SWITCHING MEANS FOR USE IN TELEGRAPH SYSTEMS AND THE LIKE

Filed Oct. 2, 1951 13 Sheets-Sheet 7

INVENTOR.

ROELOF MAARTEN MARIE OBERMAN

BY

[signature] agt

Dec. 29, 1953

R. M. M. OBERMAN

AUTOMATIC SWITCHING MEANS FOR USE IN TELEGRAPH SYSTEMS AND THE LIKE 2,664,459

Filed Oct. 2, 1951

13 Sheets-Sheet 8

INVENTOR.

ROELOF MAARTEN MARIE OBERMAN

BY

[signature]

Dec. 29, 1953

R. M. M. OBERMAN 2,664,459

AUTOMATIC SWITCHING MEANS FOR USE IN TELEGRAPH SYSTEMS AND THE LIKE

Filed Oct. 2, 1951

13 Sheets-Sheet 9

INVENTOR.
ROELOF MAARTEN MARIE OBERMAN
BY

Dec. 29, 1953 R. M. M. OBERMAN 2,664,459

AUTOMATIC SWITCHING MEANS FOR USE IN TELEGRAPH SYSTEMS AND THE LIKE

Filed Oct. 2, 1951 13 Sheets-Sheet 10

INVENTOR.
ROELOF MAARTEN MARIE OBERMAN
BY

Dec. 29, 1953

R. M. M. OBERMAN

AUTOMATIC SWITCHING MEANS FOR USE IN TELEGRAPH SYSTEMS AND THE LIKE 2,664,459

Filed Oct. 2, 1951

13 Sheets-Sheet 11

INVENTOR.
ROELOF MAARTEN MARIE OBERMAN
BY [signature]
AGT.

INVENTOR.
ROELOF MAARTEN MARIE OBERMAN
BY

Dec. 29, 1953

R. M. M. OBERMAN

AUTOMATIC SWITCHING MEANS FOR USE IN TELEGRAPH SYSTEMS AND THE LIKE 2,664,459

Filed Oct. 2, 1951

13 Sheets-Sheet 13

INVENTOR.
ROELOF MAARTEN MARIE OBERMAN
BY [signature]
Agt

Patented Dec. 29, 1953

2,664,459

UNITED STATES PATENT OFFICE 2,664,459

AUTOMATIC SWITCHING MEANS FOR USE IN TELEGRAPH SYSTEMS AND THE LIKE

Roelof M. M. Oberman, The Hague, Netherlands

Application October 2, 1951, Serial No. 249,239

25 Claims. (Cl. 178—2)

This invention relates to automatic switching means for use in telegraph systems and the like, and more particularly to automatic switching means for connecting a number of stations of an automatic telegraph exchange system in a broadcast connection.

The present application is a continuation-in-part of my co-pending application Serial No. 767,527, filed July 30, 1947, now abandoned, for Broadcast or Conference Register for Teleprinter System.

In broadcast connections of the kind referred to, a number of printer stations associated with a common exchange are connected to one station associated with the same exchange, in such a way, that signals transmitted by said one station are received by all the other stations.

It is an object of the present invention to provide means for particularly selecting by a calling station a certain number of stations which it is desired to switch in the broadcast connection.

The system according to the present invention comprises an exchange for public use, in which automatically station-to-station connections are set up between various stations of the system, whereas any station out of one or more groups of stations, more particularly such that belong to private concerns and the like, is enabled to establish broadcast-connections over automatic switching means in the public exchange between a particularly selected number of stations within its group. In known systems having broadcast facilities broadcast connections are set up manually, the calling station being connected to an operator position in the exchange and giving the operator information about the desired composition of the broadcast connection by means of the teleprinter thereof. This method renders a comprehensive consultation between the operators at the calling station and at the exchange unavoidable, so that the setting up of broadcast connections requires much time and the exploitation of broadcast arrangements is very expensive.

The present invention consists in its broadest aspect in an arrangement in an automatic exchange of a signalling system, more particularly a telegraph system, employing signals in a permutation code, which enables a station which is associated with the arrangement, to connect itself automatically to all or at least part of the stations associated with the same arrangement, by keying signals in the permutation code of the system. In the following description this arrangement is denoted as a broadcast register.

Furthermore, the present invention provides facilities enabling a station belonging to the special group to connect itself to the associated broadcast register over the automatic switching means for public use in the exchange of the system.

Furthermore, the present invention reduces the time during which called stations in the system are made busy for a broadcast message by registering the calling station's signals in a registering arrangement in the broadcast register and by switching in the desired stations simultaneously, after a consultation between the broadcast register and the calling station has been finished.

The present invention provides an apparatus in the broadcast register which is actuated by the calling station and adapted to disconnect a busy station from its call and to connect the same to the broadcast connection.

The present invention has facilities for providing a teleprinted list of the desired stations by the teleprinter of a calling station which, at the end of the broadcast message, can be checked with the list of the station really connected to the broadcast connection that have received the message perfectly well, so as to obtain a check of the stations which had a good reception of the message.

A telegraph system according to the present invention, comprises in combination, a calling station, a plurality of stations called by the calling station for receiving a broadcast message transmitted by the calling station, a register for connecting the calling station to at least part of the plurality of stations called by the calling station for receiving the broadcast message, a finder switch forming part of the register and having a contact bank and a grounded wiper engaging the same, a switch-over relay connected to a contact of the bank so as to be energized when the contact of the bank of the finder switch engages the grounded wiper, the switch-over relay connecting upon energization thereof the finder switch to the calling station, a receiving arrangement forming part of the register and receiving signals transmitted by the calling station, a first receiving relay, a second receiving relay, means for energizing the first receiving relay over the receiving arrangement when a first predetermined signal transmitted by the calling station is received by the receiving arrangement, means for energizing the second receiving relay over the receiving arrangement when a second predetermined signal transmitted by the calling station is received by the receiving arrangement, a register switch actuated by the energization of the receiving relays, and means connected to the register switch for automatically calling any station of the plurality of stations for receiving the broadcast message transmitted by the calling station.

Preferably the telegraph system according to the present invention comprises a plurality of registering relays connected to the register switch, the registering relays being associated, respectively, with the called stations, second switch-over relays being energized, respectively upon energization of the registering relays, and means connected to the second switch-over relays for automatically calling, respectively, the stations of the plurality of stations for receiving the broadcast message transmitted by the calling station.

A preferred embodiment of the present invention comprises a plurality of back-report relays connected, respectively, to the stations, means for energizing the back-report relays, respectively, by the stations temporarily at the end of a broadcast message transmitted by the calling station, and means controlled, respectively, by the back-report relays for indicating at the calling station a good reception by the stations connected to the back-report relays, respectively, of the broadcast message transmitted by the calling station.

In a preferred embodiment of the present invention the receiving arrangement includes a plurality of movable code rails, movable contacts attached, respectively, to the code rails and stationary contacts cooperating, respectively, with the movable contacts, means for positioning the code rails, respectively, according to the code elements of a received signal being provided so that the cooperating contacts are closed and opened in combination with, respectively, according to the code elements of the received signal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 3:
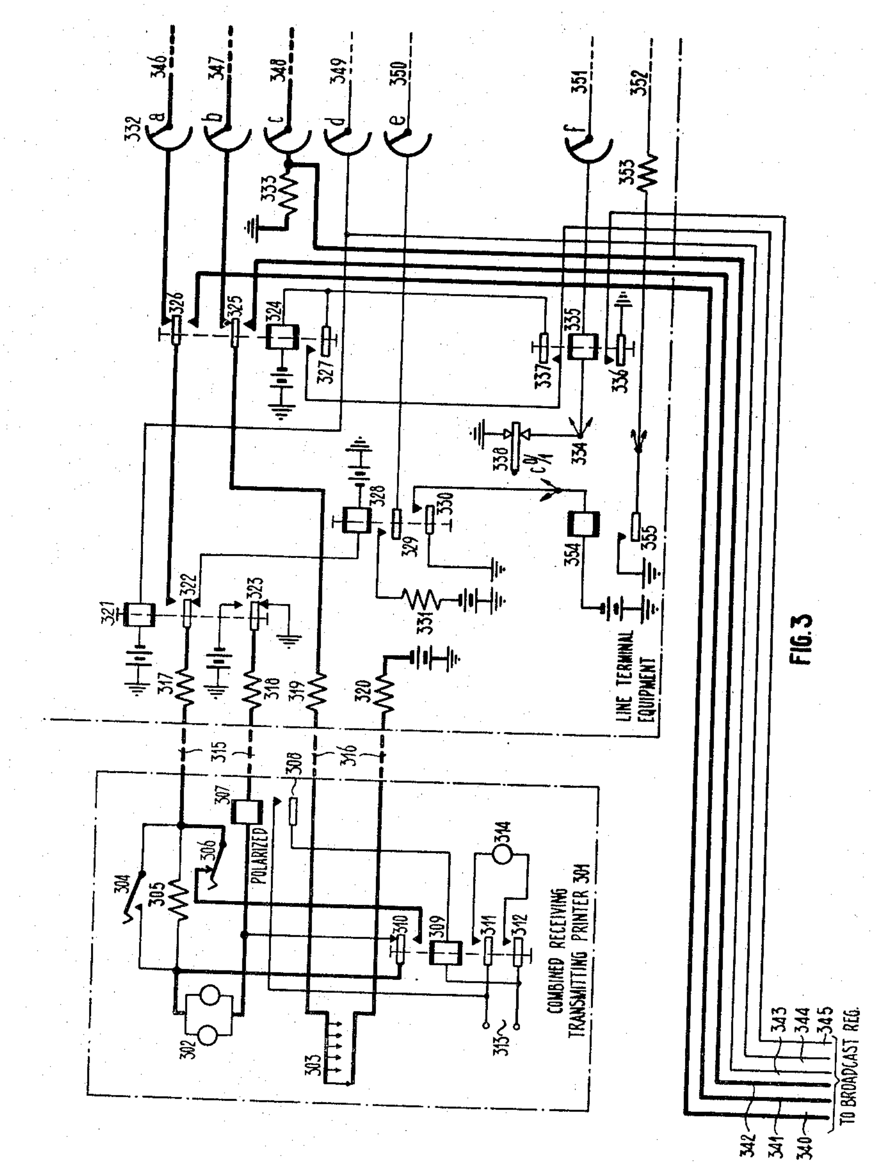
Figure 4:
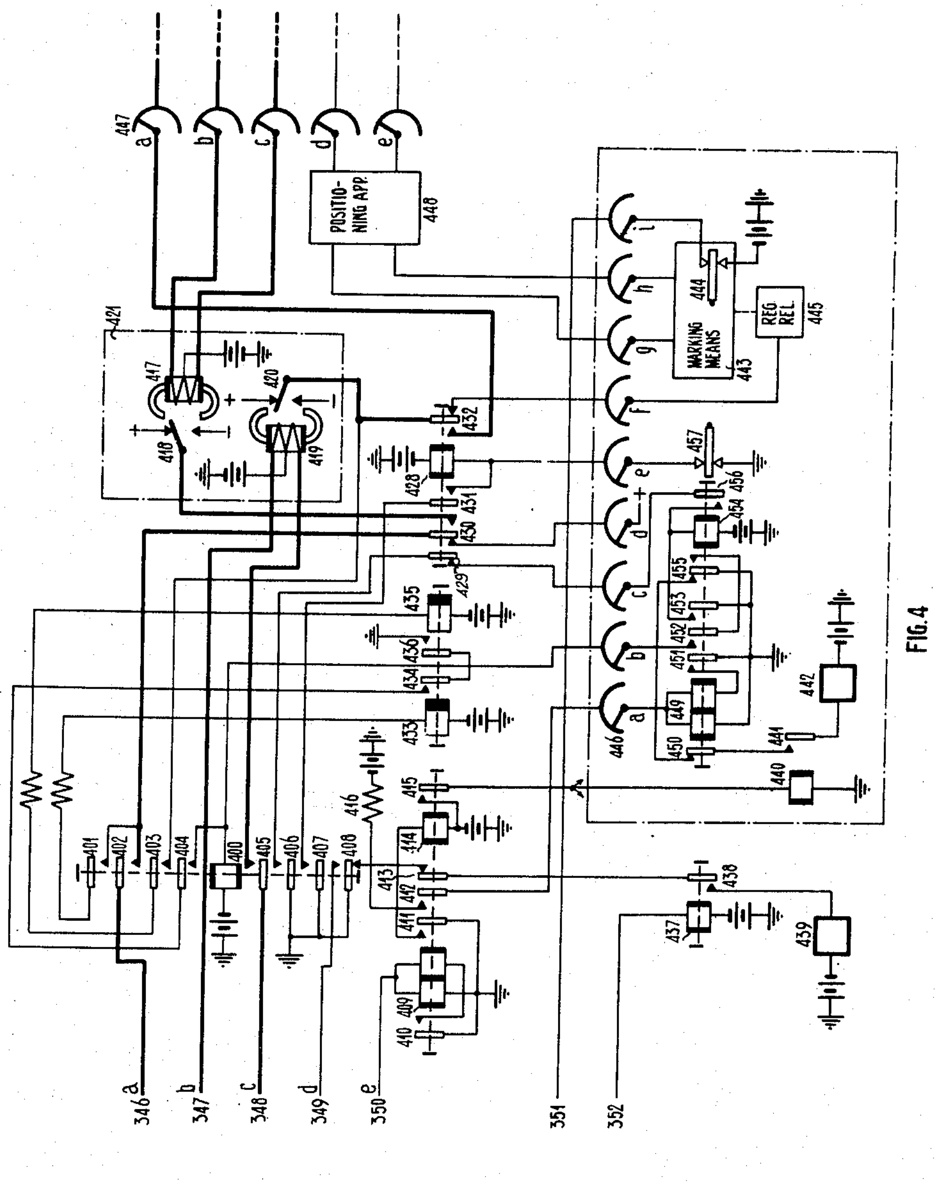
Figure 5:
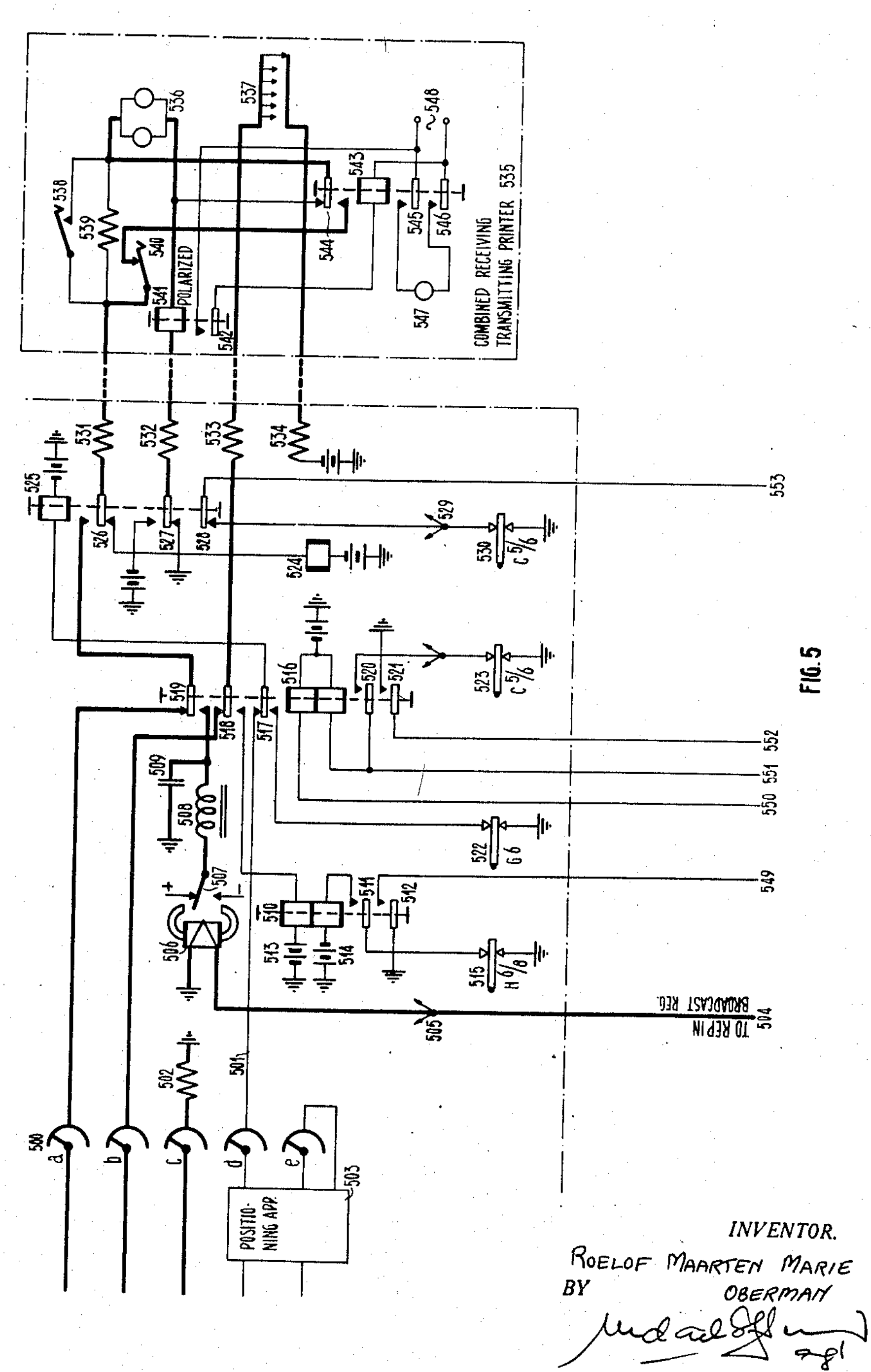
Figure 6:
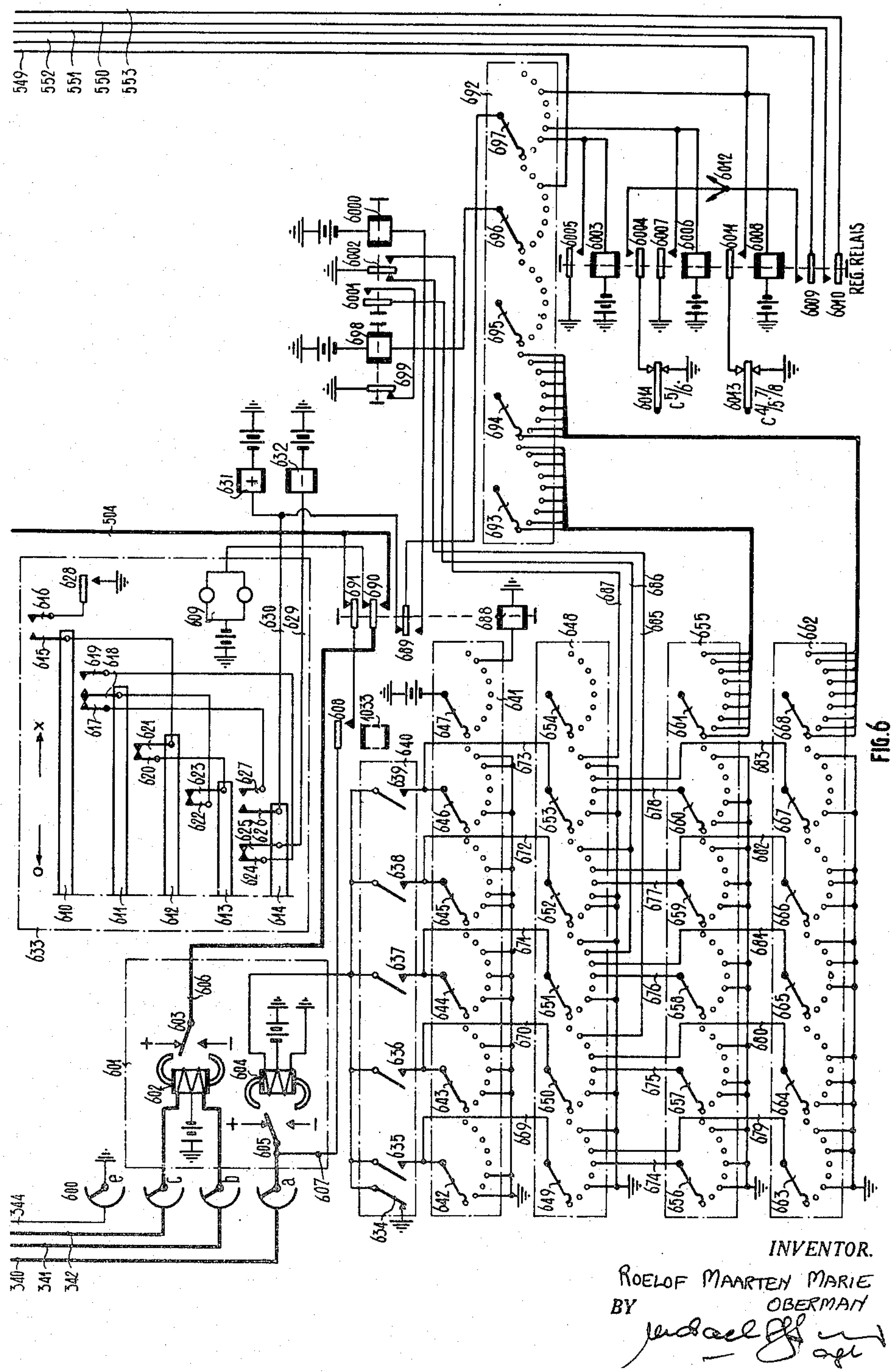
Figure 11:
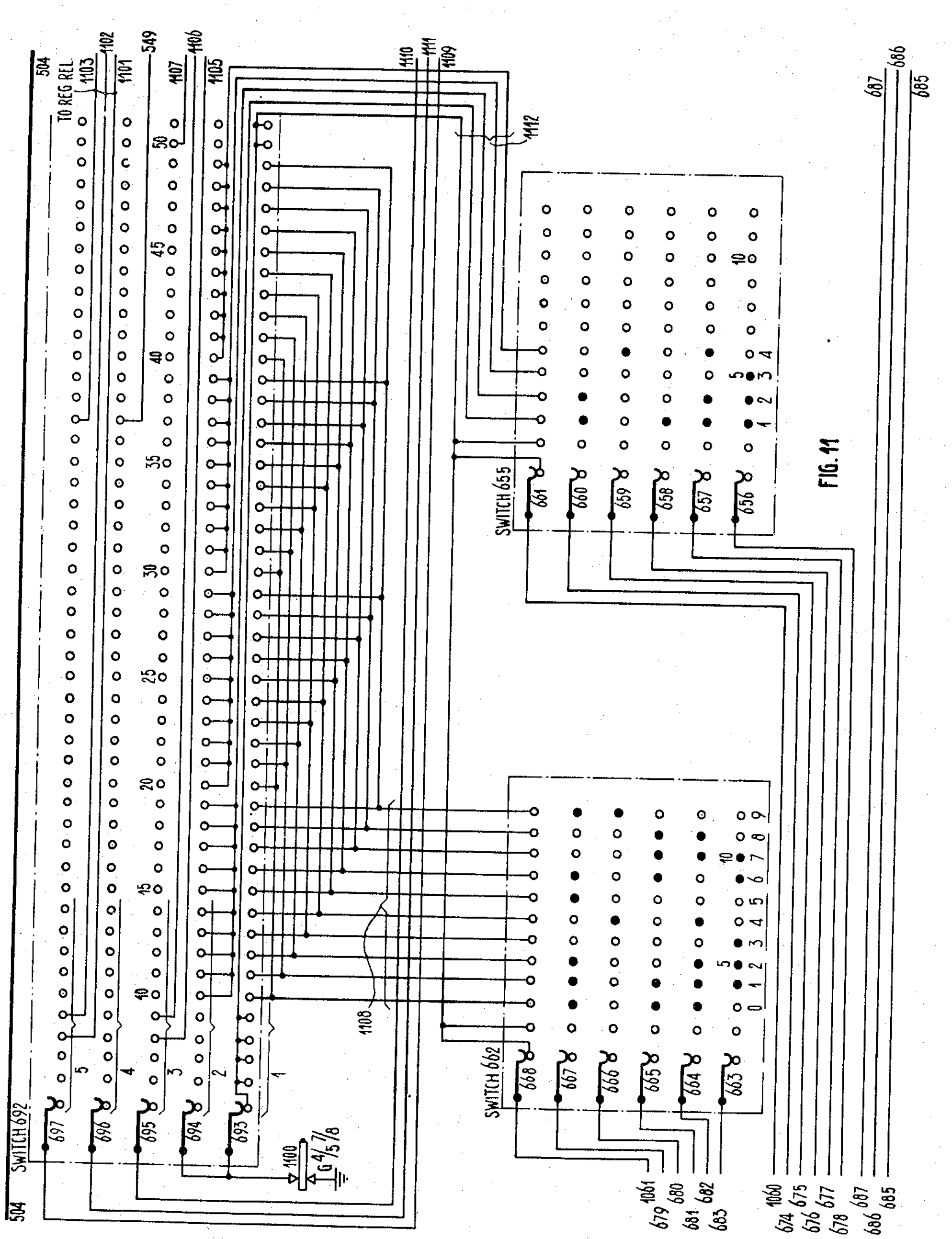
Figure 12:
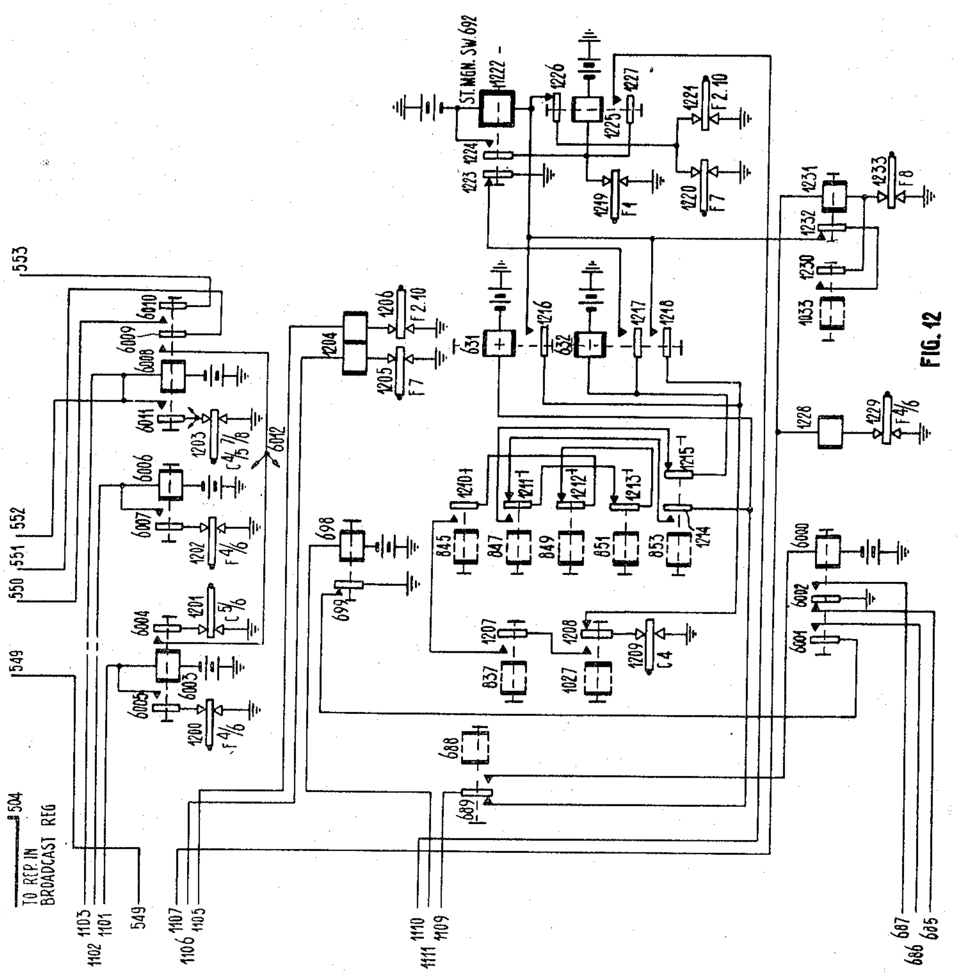
Figure 13:
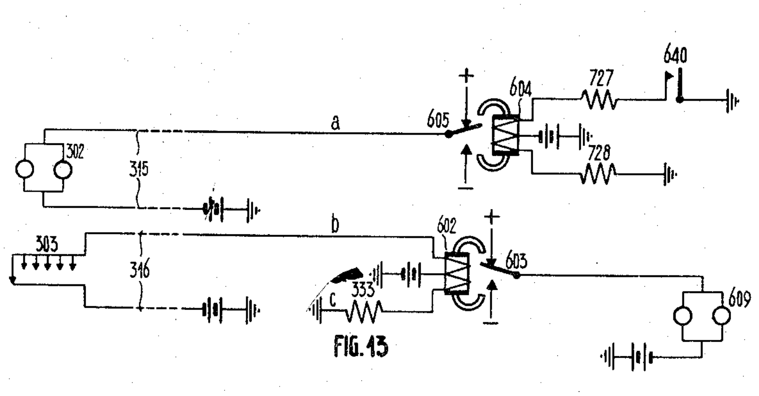
Figure 14:
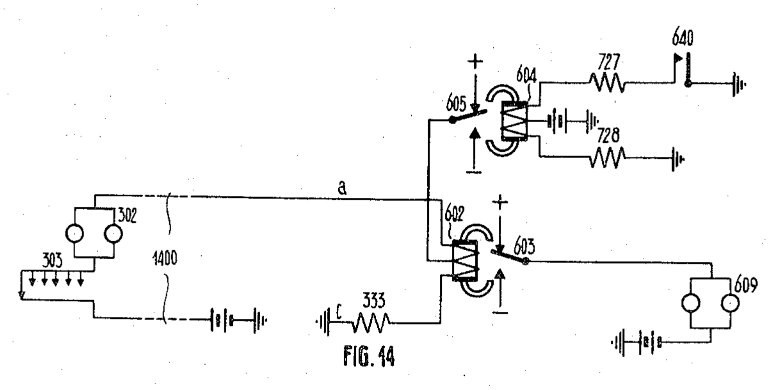
Figure 15:
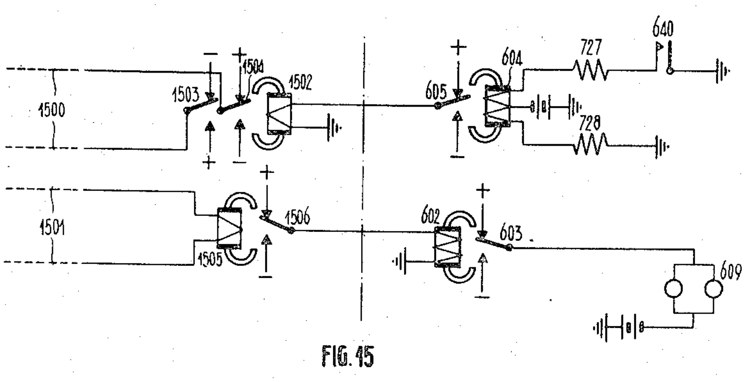
Figure 16:
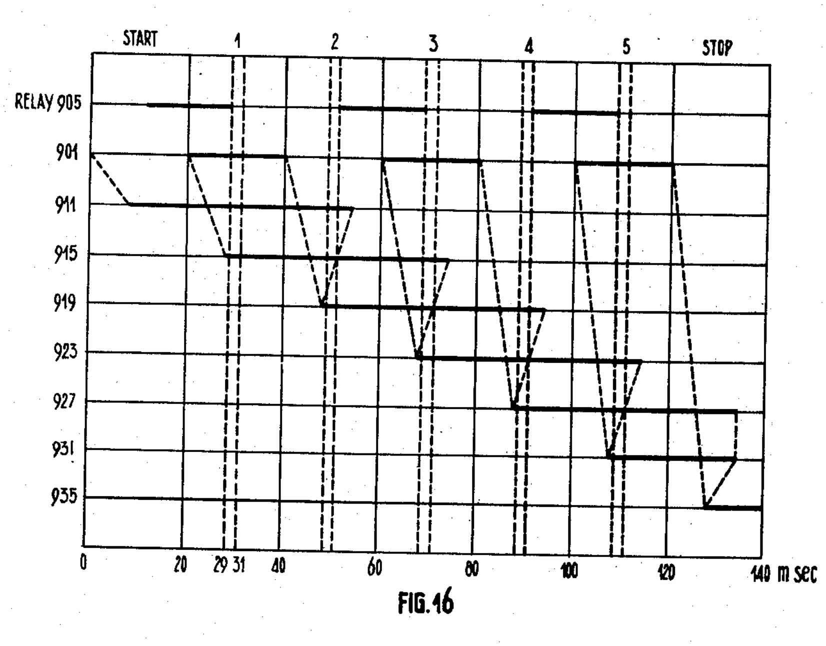
Figure 17:
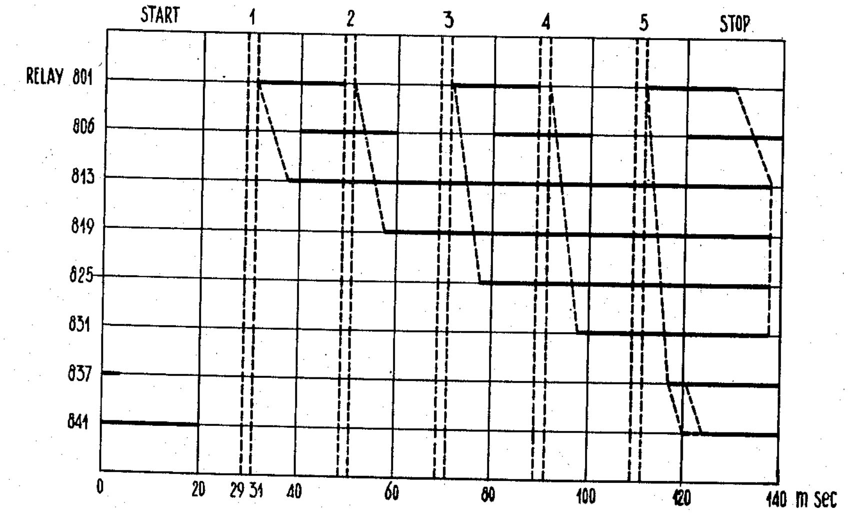

Figs. 3–5, inclusive, show a telegraph exchange system according to the register type, being adapted to cooperate with a broadcast register for the setting up of broadcast connections between particular stations of the system;

Fig. 6 shows the general arrangement of such a broadcast register in an exchange;

Figs. 7–12, inclusive, show the apparatus incorporated in a broadcast register and the arrangement thereof, in greater detail;

Figs. 13, 14 and 15 show, respectively, the different modes of connecting a calling station to a telegraph repeater in an exchange; and Figs. 16 and 17 are time diagrams of the operation of certain relay arrangements incorporated in the broadcast register shown in Figs. 7–12.

I. *Description of the apparatus incorporated in the telegraph system*

Figure 1:
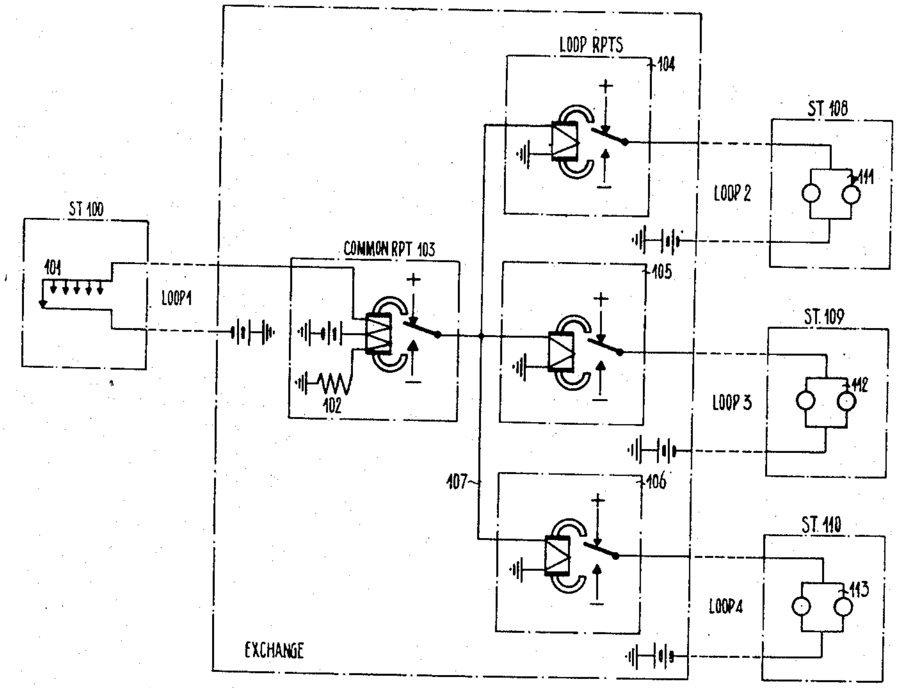
Fig. 1 shows the general arrangement of a broadcast connection according to the invention.

Referring now to the drawings and first to Fig. 1, a station 100 is connected at the same time to the stations 108, 109 and 110 over a common repeater 103 and loop repeaters 104, 105 and 106 in the exchange, the communication in this connection being fully simplex. The transmitting station 100 has arranged the transmitting means 101 thereof in a first loop which terminates in the exchange in the polarized relay of the common repeater 103. The armature of this relay controls over a conductor 107 polarized relays of the loop repeaters 104, 105 and 106 on a full double current basis, the secondary side of the loop repeaters being adapted to retransmit signals from the broadcast station 100 on a full single current basis to the receiving stations 108, 109 and 110 over the loops 2, 3 and 4, respectively. It may be observed, that in the system of the invention stations, like 100, and 108–110, inclusive, are equipped with combined receiving and transmitting printers, the receiving means of stations like the station 100, and the transmission of stations like the stations 108–110, inclusive, being, however, in general not used for broadcast communication.

Referring now to Figs. 3, 4 and 5 of the drawings, the telegraph exchange system, there shown in principle, comprises a number of various stations, of which only two stations are shown, equipped with the teleprinters 301 and 535, the first being considered in the following description as a calling station, the second being considered hereafter as a called station. The stations are connected via four wire single current lines and line terminating equipment to the automatic switching means in the exchange, such as to the contacts of a line finder 332 and a final selector 500. In Fig. 4 the junction circuit is shown with a telegraph repeater 421, a group selector 447 and a cord finder 446; moreover, a normal register is shown in the lower rectangle, adapted to receive and register the selecting criteria from the calling station and to control successive selectors, such as the group selector 447 and the final selector 500, to establish a connection between any two stations associated with the system.

The stations are equipped with combined receiving and transmitting teleprinters 301 and 535, respectively, which are of a normal type, the printer 301 for instance having reception coils 302 and transmission contacts 303, which are arranged in two separate loops. Preferably the circuit from the station to the exchange is arranged as a four wire line, two wires forming a reception loop 315 terminating in the reception magnet coils 302, the other wires forming a transmission loop 316 terminating in the transmission contacts 303. When a call is being made, the reception loop 315 is controlled in a manner to be described more in detail hereinafter by the tongue 418 of the polarized transmitting relay 417 in the repeater of the exchange junction circuit. In spacing condition the tongue 418 is in contact with the positive terminal of battery, so that a spacing signal current flows through the reception coils 302 of the printer 301; in marking condition the tongue 418 rests against the negative terminal of the battery so that the current in loop 315 is interrupted owing to the connection of both ends of the loop to the same battery terminal. When a call is being made the transmission contacts 303 are arranged in a circuit from negative battery in the exchange, via the transmission loop 316, a contact 325, the *b*-wiper of line finder 332, through the upper winding of a polarized receiving relay 419 in the repeater 421, to positive battery. To the relevant contact in the third level of the bank of contacts of the line finder 332 a compensation resistor 333, individual to the station 301 is connected which has a resistance value, which is about equal to the resistance of the transmission loop 316. The *c* brush of the line finder 332 is connected to positive battery via a second winding of the receiving relay 419, so as to impart an energization to that relay, which is opposite to and about half as strong as the energization of the first winding. If the above traced transmission circuit is interrupted by the transmission contacts 303, the tongue 420 effects the retransmission of the signals to the connected subscriber, via the change-over contact 432 in operated condition, the *a*-brush of group selector 447 and final selector 500, contacts of line relays 516 and 525, reception magnet coils 536, a contact 527 to negative battery, owing to the fact that the magnetization left is of opposite direction, whereby the tongue 420 moves over to the opposite terminal of battery.

For the operation of the system, some auxiliary apparatus at a subscriber's station is necessary, comprising a resistor 305 in the reception loop, a start key 304, which in operated condition short-circuits the resistor 305, a release key 306, a polarized relay 307, arranged to be energized by the space loop current, and A. C. power supply 313; an A. C. relay 309, e. g. a D. C. relay in combination with four rectifiers in a Graetz-circuit (not shown), and the printer motor 314. A dial (not shown) may be arranged in the transmission loop 316 for selecting purposes; however the invention may be applied also to systems in which selective criteria do not consist of a series of dialled impulses but are signals in the permutation code, transmitted at the station's keyboard.

The normal line terminal equipment comprises a line relay 328 and a cut-off relay 321, which relays operate consecutively upon reception of a call as described more in detail hereinafter. The station 301 is in the drawing and description assumed to belong to a special group of stations having the facility of setting up broadcast connections between all those stations, belonging to the same group. It should be understood that a plurality of such special groups could be provided within the described system. In this case for each group a broadcast register, according to the invention, is provided. Care must be taken, that only stations, which belong to a special group have access to a broadcast register and, moreover, that they have only access to the broadcast register of their own group and are not admitted eventually to other broadcast registers. For this purpose, each line terminal belonging to a broadcast group has, apart from the normal line and cut-off relays, a switch-over relay 324, which at the contacts 325 and 326 thereof disconnects the *a*- and *b*-wire from the normal exchange junction circuit and connects the same to the relevant contacts in the bank of contacts of a station finder in the broadcast register. Furthermore each line terminal is provided with a control relay 335, which is energized from a negative battery to the normal register after the operator at station 301 has transmitted the necessary selecting signals to the normal register, and which prepares the energizing circuit of the switch-over relay 324.

The mechanism of the line finder 332 comprises the following parts:

A start relay 437 which is energized upon the reception of a call by the line relay 328, a clutch magnet 439 being individual to the line finder 332, and a test relay 409 the left hand winding of which has a high resistance value, the right hand coil having a low resistance value. The relay 409 energizes at the contact 411 a start relay 414 common to a group of cord finders, of which only the cord finder 446 is shown.

The cord finder 446, which is supposed to be the first cord finder of the group reaching the contacts of the calling connecting link, comprises a clutch magnet 442 and a test relay 449 which is provided with a high resistance and a low resistance winding. The clutch magnet is energized by the closure of contact 441 of relay 440 which in turn is energized by the closure of contact 415 controlled by the start relay 414.

The junction circuit and the register can be designed according to principles known in the art and may operate in various manners which are of no importance for the application of the system for setting up broadcast connections by means of a broadcast register. The junction circuit and the register to be described hereinafter are shown only by way of example and only so far as it is necessary for a full explanation of the invention. It will be clear from a reading of the description, that the system according to the invention may also be applied to telegraph systems, in which station-to-station connections are normally set up over selectors operated by the calling station without the aid of a registering device, means being provided which enable a station to seize the broadcast register thereof.

The junction circuit and the register shown in Fig. 4 comprises a cord-seizure relay 400 and a register-seizure relay 454, which are energized for the time periods during which the cord circuit and the register are busy, respectively.

A switch-over relay 428 is energized over a contact 457 of the register-sequence switch after the positioning of the various selectors has been finished, and two guarding relays 433 and 435 are adapted to interrupt the holding circuit of the seizure relay 400, when a station-to-station call is closed by the calling or the called party, respectively.

The registering arrangement 445 in which selective signals e. g. a series of digit impulses, are received from the relay 419 of the repeater, the control arrangement 443 which controls the positioning apparatus 448 of the group selector 447 and also the positioning apparatus 503 of the final selector 500, are indicated by blocks for the sake of clearness. In the event, that the received selective signals are such, that the calling station should be switched over to the broadcast register, negative battery is applied to the relay 335 via the conductor 351 by the *i*-wiper of the cord finder 446. It should be noted, that obviously the mode of performing this is dependent on the way of selecting and positioning in the system, in which the broadcast register is used. In a register system, having marking switches in the register which are positioned under the control of a series of dialled impulses, battery could be connected to the wiper *h* over a series arrangement of marking switch contacts defining a path which is only completed at the combination of contact positions corresponding to the number of the broadcast register in the system. Such a contact combination is symbolized by the contact 444.

Fig. 5 shows, apart from the wipers *a–e*, inclusive, with the corresponding levels in the bank of contacts of the final selector 500, and the combined receiving and transmitting printer 535 with control apparatus being designed in the same manner as printer 301, the outgoing side of the line terminating equipment of a station belonging to a special group, as indicated before. It should be noted that the relay means adapted to switch over a station of such a special group to its broadcast register have been omitted here since they are shown in Fig. 3 of the drawings. If the station 535 is to be provided with the facility of the extension of a broadcast call, the connection of the printer thereof to a line finder analogous to line finder 332 must be provided with relays corresponding to relays 328 and 336 shown in Fig. 3.

The terminal equipment individual to the station 535 comprises a line relay 524 the contacts of which are not shown, a cut-off relay 525, a switch-over relay 516 (termed hereinafter the second switch-over relay), a report-back relay 510 and a repeater having a polarized transmission relay 506. These relays, and the contacts 515, 522, 523 and 530 common to all the stations of the special group, operate in a way to be more fully explained hereinafter.

Referring now to Fig. 6 of the drawings, the principle of the arrangement of a broadcast register according to the invention is shown. The register comprises a station finder 600, a repeater 601, a receiving arrangement 633, a transmitting arrangement 640, the stepping switches 641, 648, 655 and 662, a switch-through relay 688, a stepping switch 692, two registering relays 6003 and 6006, a set of registering relays, which are equal in number to the stations of the special group and of which only the relay 6008, individual to the station 535 is shown, two receiving relays 631 and 632, and the report-back relays 698 and 6000, the purpose of which will be more fully explained hereinafter.

Fig. 6 is to be considered as a schematic of the arrangements, all details as to function and means thereto being omitted, so as to give a clear idea of the operation of the broadcast register. In Figs. 7–12, inclusive, the same register is shown in greater detail, including the means which enable the apparatus shown in principle in Fig. 6 to operate in a desired manner.

It is noted first that the station 301, when extending a call to the broadcast register, is switched over to the station finder 600 of the broadcast register at the contacts 325 and 326 of the switch-over relay 324 (termed hereinafter the first switch-over relay) which is energized, when after the positioning of the station finder 600 (by means of the clutch-magnet 708 thereof shown in Fig. 7) ground is applied over the *e*-wiper to the conductor 344. Over the *a*, *b* and *c*-wipers and the relevant contacts in the contact bank of the station finder 600 the printer 301 has access to the primary side of a telegraph repeater 601 in the broadcast register. It is remarked that the windings of the polarized reception relay 602 with the armature 603 thereof and the windings of the polarized transmission relay 604 with the armature 605 thereof are arranged for co-operation with the printer 301 quite in the same manner as the polarized relays 417 and 419, respectively, of the repeater 421 in the junction circuit of the exchange. The balancing resistance 333 serves the previously explained purpose in the same way and thus, after switching through, signals from the printer 301 may be received by the reception relay 602 of the repeater 601 and retransmitted at the tongue 603 thereof to the receiver 633. Also, the transmission contacts 634–639, inclusive, can effect the transmission of a number of predetermined signals by the transmission relay 604 of the repeater 601 in a way more fully explained hereinafter.

The essential parts of the receiver 633 are the contact springs 615–627, inclusive. Although a full description of the operation will be given hereinafter it is observed that the contacts, closed and broken by the shown contact springs are arranged and operated in such a manner, that ground is applied to the winding of the first receiving relay 631 in the event that a first predetermined signal is received from the station 301, while a second receiving relay 632 is energized, in case a second predetermined signal is received, whereas upon the reception of any other signal in the permutation code of the system, neither receiving relay 631, 632 is energized.

The contact springs 615–627 inclusive, should be positioned under the control of the code elements of the received signals. The register shown in Fig. 6 is intended for a telegraph system using the normal five-unit code signals, and the signals "+" (code: X000X) and "—" (code: XX000) are the preferred predetermined signals. Thus it will be understood that a closing contact 615—616 should be positioned under the control of the first signal element, a change-over contact 617—618—619 should be positioned under the control of the second signal element and a cut-off contact 620—621, a cut-off contact 622—623, and two contacts, a cut-off contact 624—625, and a closing contact 626—627, should be positioned under the control of the third, fourth and fifth signal element, respectively. It is observed, that all contacts-springs are shown in the condition which they have if the relevant signal element is a marking element.

In the embodiment of the invention shown in Fig. 6, the contact springs 615, 618, 621, 623, 625 and 627 are mounted on the reception code rails 610–614, inclusive, of a combined receiving and transmitting printer of a usual type, which are only shown in principle. The idle current of the receiver magnet coil 609 of this teleprinter is interrupted, when at the reception of the start element of a signal relay 602 moves over the armature 603 thereof to negative battery terminal, and by means of a release mechanism (not shown) a reception cam shaft (not shown) of the teleprinter is released for one single rotation. In a way, which needs no further explanation, the magnet in cooperation with the cam shaft, positions the reception code rails 610–614 successively, in accordance with the nature of the five consecutive code elements of the received signal. If, for example, the third element is a spacing element, code rail 612 is shifted to the right, and contact spring 621 mounted thereon breaks the contact with contact spring 620. In case the third element is marking, the code rail 612 is not moved and the contact 620—621 remains in closed condition.

In a way not shown the reception cam shaft closes the auxiliary contact 628 at the end of its rotation, thereby completing the circuit for one of the relays 631 and 632, dependent on the received signal.

The broadcast register transmitter 640 comprises as its more essential parts the start-stop contact 634 and a set of five transmission contacts 635–639, inclusive. A spacing impulse can be extended to the polarized transmission relay 604 by cutting off the ground from the upper winding of the latter, in consequence of which the tongue 605 of relay 604 is moved over to negative battery terminal. The energizing path of the upper winding has a resistance value which is, for instance, about half the value of the circuit of the lower winding.

Thus, by breaking the start-stop contact 634, and, twenty milliseconds thereafter, closing the transmission contacts 635–639 successively, each for a period of twenty milliseconds, and thereupon closing the start-stop contact again, a signal can be transmitted, which is predetermined by the permutation in which the transmission contacts have been grounded.

The contact 634 may be the start-stop contact and the contacts 635–639 may be the five transmission contacts of the combined transmitting and receiving printer, the reception means of which are used as a register receiver 633. It may be observed, that all printing means of a normal teleprinter are of no use for the purpose previously described, so that the same may be removed, if a normal teleprinter is to be used for receiving and transmitting purposes in a broadcast register according to the invention.

Figure 8:
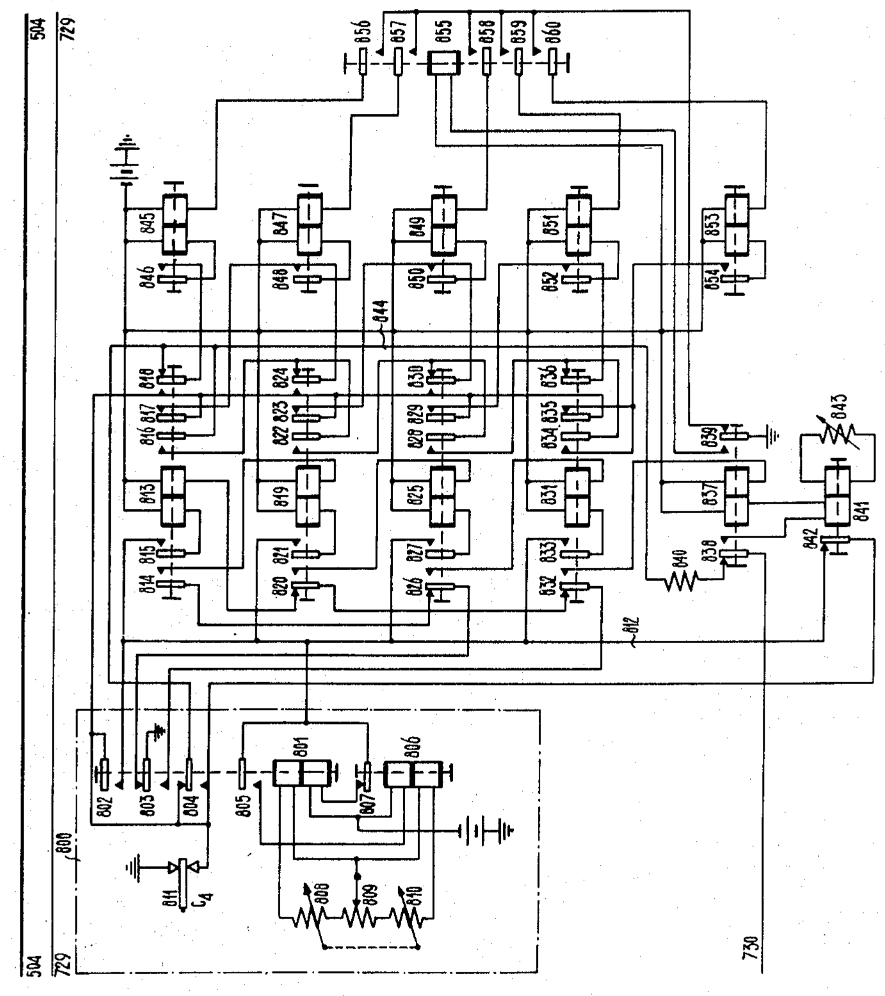
Figure 9:
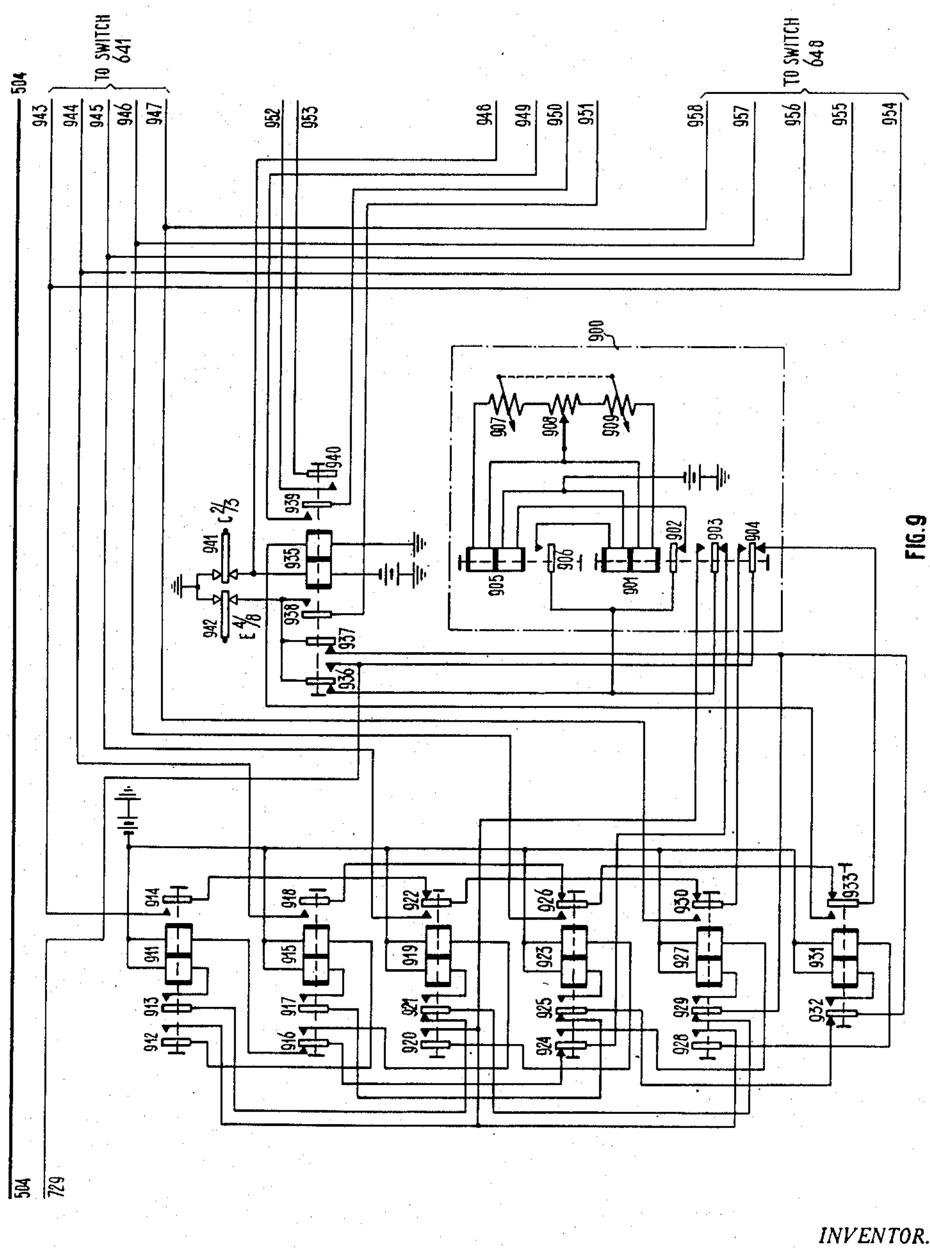

In practice, however, such mechanically operated means for the purpose of positioning the receiver contacts and of operating the transmission contacts will seldom be applied and will be replaced by relay arrangements, of which examples are shown in Figs. 8 and 9 of the drawings to be more fully described hereinafter.

Each of the transmission contacts 635–639 is connected to a wiper of a switch 641 and to a wiper of a switch 648. The switch 641 is a stepping switch of a type well-known in automatic telephone systems and comprising six wipers, 642–647 inclusive, of which five, viz. 642–646 are connected to the transmission contacts 635–639, respectively, and six levels of contacts cooperating, respectively, with the wipers 642–647 by means of which the control of the switch 648 is effected.

Figure 10:
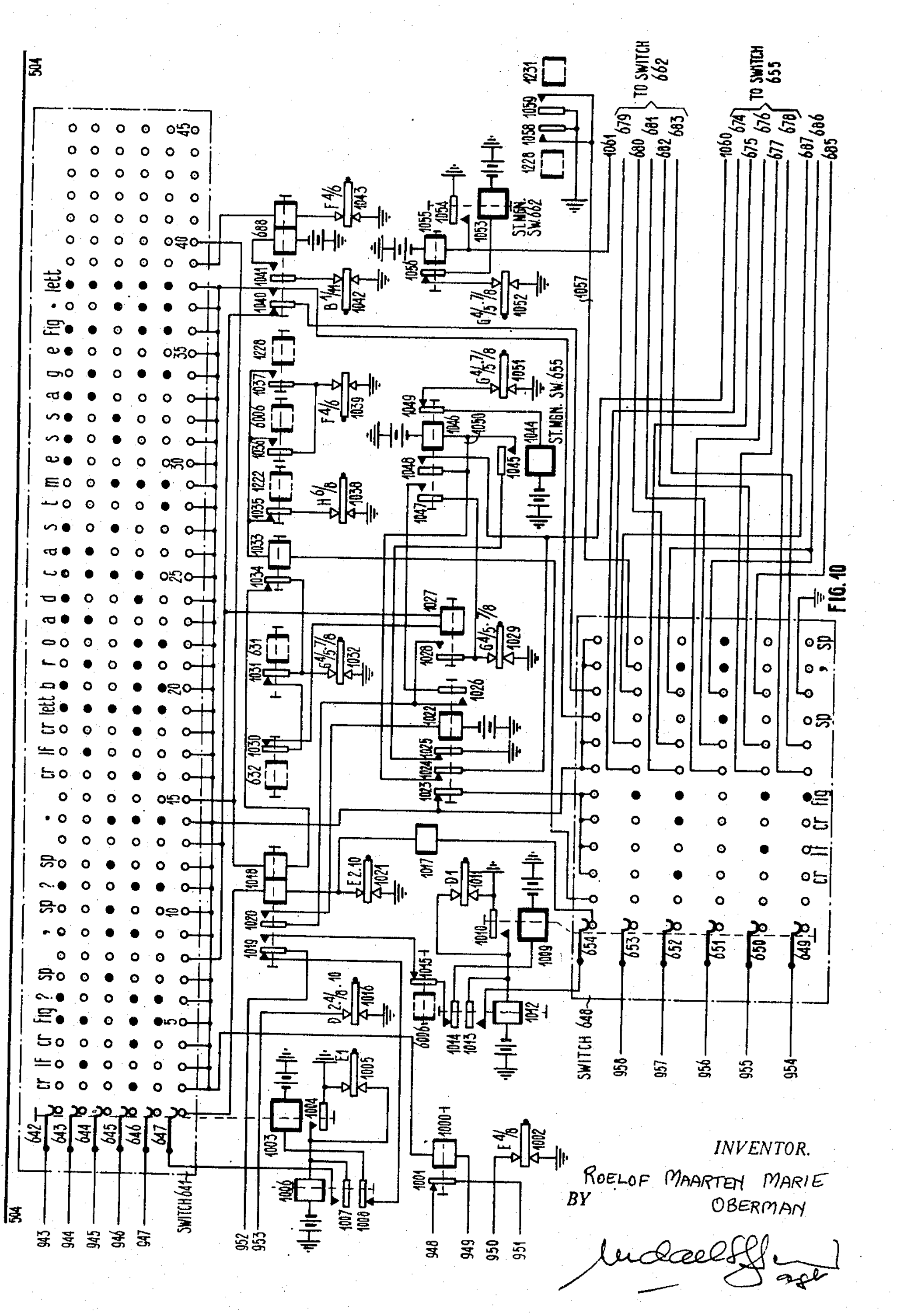

The switch 648 is provided with six wipers 649–654 and corresponding levels of contacts having analogous functions as the contact levels of switch 641. The contact levels of the switches 641 and 648, as well as those of the switches 655 and 662 are shown in a diagrammatic manner in Fig. 6. In Figs. 10 and 11 of the drawings an example of a full showing of these contacts banks is given.

Part of the contacts in the first five levels in the bank of contacts of the step-by-step switches 641 and 648 are grounded in certain combinations, so as to obtain a contact arrangement by means of which predetermined code signals may be extended to the repeater 601. If, for instance the set of wipers 642–646 reaches the $n$th contacts in the various levels and if the contacts in the first three levels and in the fifth level are grounded and that in the fourth level, not grounded, at the operation of the transmitter 640 after the start impulse (space), the signal (mark, mark, mark, space, mark) is transmitted to the printer 301. This is a control signal "carriage return."

Corresponding contacts of the various levels in the contacts bank of the switch 648 are through-connected to the wipers of two further switches, 655 and 662, which are likewise step-by-step switches of a usual design. Part of the contacts in the first five levels of these switches 655 and 662 are grounded in certain combinations for the same purpose as previously explained. It is noted, that in this way predetermined signals are transmitted at the contacts of the switch 648 to the wipers of the switches 655 and 662, which signals can be retransmitted by the repeater 601 in two consecutive positions of the switch 648.

The step-by-step switches 655 and 662 are provided with sixth wipers 661 and 668, respectively, and corresponding levels of contacts in the contact banks which contacts are connected in a particular manner to the contacts of the first and the second level of contacts of a further step-by-step switch 692, so as to control the stepping movements of these three switches in a way, which will be more fully described hereinafter.

The step-by-step switch 692 is of a known design having at least five wipers 693–697, inclusive, with corresponding levels of contacts. Contacts in the fifth level are connected to a group of two registering relays 6003 and 6006, and to a further group of registering relays, of which only the relay 6008 is shown. For each station associated with the broadcast arrangement such a relay is provided, relay 6008 being the one corresponding to the printer station 535.

The registering relays are all provided with a closing contact over which a holding circuit is established after energization of the registering relays. Furthermore, the same have contacts cooperating with switching relays in the terminal equipment in the exchange, which are individual to the stations.

The operating features of these relays and of the relays 698 and 6000 connected to the wipers 696 and 697, respectively of the switch 692 will be more fully described hereinafter.

Figure 7:
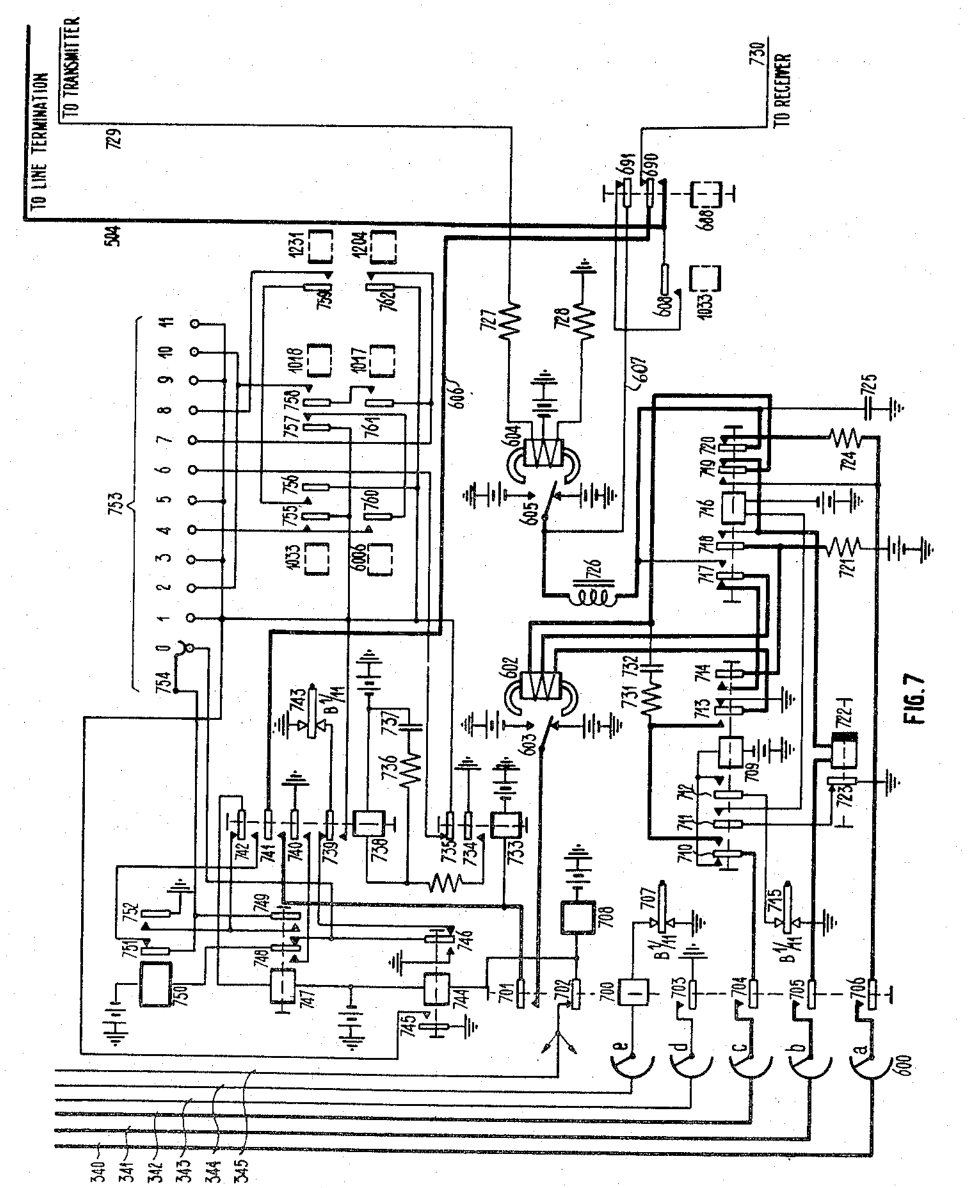

Considering now the broadcast register in greater detail, with reference to Figs. 7–12 of the drawings, it is noted that Fig. 7 shows a preferred embodiment of the repeater 601 for use in a broadcast register provided with relay-means, to adapt the manner of connecting the polarized relays 602 and 604 to the calling line. Moreover the upper portion of Fig. 7 shows the control means of a sequence switch 753 used in the broadcast register in a way to be more fully explained hereinafter. Fig. 8 shows a relay arrangement, which can be used as a receiver for the broadcast register in a manner previously described in connection with the printer receiver 633. Fig. 9 shows a relay arrangement adapted to be used instead of the transmitting printer 640 previously described. The stepping switches 641 and 648 are shown in full detail in Fig. 10, the stepping switches 655 and 662 and the stepping switch 692 in Fig. 11, while Fig. 12 shows the registering relays and a group of other relays forming part of the arrangement.

As previously described and shown in Fig. 3 of the drawings, the station 301 which is supposed to extend a call is connected to the exchange over two separate loops, a transmission loop 316 and a reception loop 315. However, other subscriber's printers may have the transmission contacts arranged in series with the reception magnet coils in one and the same loop. It is also possible, that district stations are connected to the exchange via trunk lines having separate loops, in which a spacing condition is not effected by interrupting the line current, but by inverting the polarity of the current.

In all cases the repeater must be so arranged in the junction circuit, that it is adapted to cooperate with the calling stations. This holds for the repeater 421 in the exchange cord circuit as well as for the repeater in the broadcast register.

These repeaters are therefore provided with means allowing to ascertain the nature of the calling line and to adapt the repeater circuit to this line.

For this purpose the repeater shown in Fig. 7 comprises a relay 709, that is energized only in case a single current line is found by the subscriber finder 600, and a relay 716, that is energized only in case a single current line having a combined reception and transmission loop is calling. If a district subscriber on the contrary extends a call and is connected to the repeater, the relays 790 and 716 do not operate for reasons which will be more fully explained hereinafter.

The sequence switch 753 comprises a control wiper 754 with a corresponding row of contacts O–11, by means of which, in cooperation with a stepping magnet 750, control relays 738 and 747 and a group of relay-controlled contacts 755–762, inclusive, the stepping movements of the sequence switch are controlled. Furthermore, the sequence switch comprises seven stages denoted by A–H, inclusive, which consist of wipers in cooperation with rows of contacts and close several grounded contacts in the broadcast register at predetermined moments during the building up of the connection. For the sake of simplicity these wipers and contacts are not shown in the drawings; however, the places in the circuit, where ground is applied via a contact of the sequence switch and the relevant wiper in predetermined positions are indicated in a known manner by the reference characters B–H of the wipers and by the positions of the sequence switch, in which ground is applied. A reference B 1/11 for example means, that ground is applied via wiper B of the sequence switch and the contacts 1–11 inclusive in the relevant row of contacts.

The energization circuits of the relays 1033, 6006, 1017, 1018, 1204 and 1231 are not shown in Fig. 7, but may be traced in Figs. 10–12.

The relay receiver, shown in Fig. 8 and adapted to receive telegraphic signals in the five unit start-stop code, comprises a relay-interrupter 800 including the relays 801 and 806, which operates like the motor of a normal receiving printer. Furthermore a counting arrangement, comprising the relays 813, 819, 825, 831 and 837 is provided. The relay 837 also performs a function, which shows a certain analogy with that of the cam shaft in a receiving printer. Furthermore a set of impulse wiping relays 845, 847, 849, 851 and 853 and a relay 855 are provided. After the reception of a signal the relay 855 restores the receiver to normal, by closing the energizing circuits of the relays 845, 847, 849, 851 and 853, again at the contacts 856–860, inclusive, thereof.

The operation of the relay receiver which may be compared to that of the receiving arrangement of a teleprinter will be more fully described hereinafter.

The relay transmitter shown in Fig. 9 comprises a relay-interrupter 900, including the relays 901 and 905 which has a similar function as the motor of an automatic telegraph keyer. Furthermore, a counting arrangement is provided comprising the relays 911, 915, 919, 923, 927 and 931, which cooperates with the stepping switches 641 and 648 in a manner, which might be compared to the wiping by the wiping levers of a perforated strip in an automatic keyer. Finally, a relay 935 starts and stops the transmission of a signal by the relay transmitter in a manner more fully to be described hereinafter.

Fig. 10 shows the stepping switches 641 and 648, together with auxiliary relays, and control relays and stepping magnets of the stepping switches 655 and 662 shown in Fig. 11. The stepping switch 641 comprises six wipers 642–647 inclusive, and for each wiper a row of contacts which are shown black-colored, if ground is applied to the relevant contact. Furthermore, a stepping magnet 1003 and a control relay 1006 are provided. The number of contacts in each row is dependent on the facilities which are to be provided for the register and may be for instance 50 for a normal type.

The stepping switch 648 comprises a set of six wipers 649–654, inclusive, with corresponding rows of contacts, each row in the example having 12 contacts, and a stepping magnet 1009 with a control relay 1012. The seventh contacts in the five first levels of contacts are connected to the first five wipers of the switch 655 via a set of conductors 674–678, the eighth contacts of the five first levels are connected to the first five wipers of the switch 662 over conductors 679–683 whereas the tenth contacts are connected via wires 685–687 to the contacts of a relay 6000 shown in Fig. 12, in a manner nearer to be described hereinafter.

When considering the operation of the various switches during the setting up of the broadcast connection, the features of the further relays and contacts, shown in Fig. 10, will be explained. It should be noted, that a number of relay-controlled contacts (1015, 1030, 1031, 1035, 1036, 1037, 1058, 1059) are shown in the drawing, the corresponding relays being indicated in dotted lines. The operating circuits of these relays are shown in Fig. 12 of the drawings.

Considering Figs. 11 and 12 together, it is noted, that the stepping switch 692 comprises a set of five wipers 693–697, each wiper proceeding in a corresponding level of contacts numbered 1–5, inclusive, and a stepping magnet 1222 with a control relay 1225.

The number of contacts in the levels 1–5 of the stepping switch 692 depends on the number of stations, which may be connected as a maximum to the broadcast connection. In the embodiment shown the number of contacts is 48, whereby as a maximum 40 stations can be associated with the broadcast arrangement. An enlargement of this capacity can be reached by some slight adaptations.

The stepping switch 655 comprises five wipers 656–660, inclusive, with corresponding levels of contacts, these contacts being ground in predetermined combinations, a sixth wiper 661 with corresponding level of contacts for the control of the switch, a stepping magnet 1044 and a control relay 1046, both shown in Fig. 10. The combinations of grounded contacts in four consecutive positions of the switch 655 are such, that in a way, previously described in these positions the permutation code signals corresponding to Figs. 1–4, respectively, are transmitted.

The contacts in the first five levels of switch 662 are also partly grounded, so as to transmit in ten consecutive positions of this switch the signals, corresponding in the permutation code with the figures 0–9, respectively. Switch 662 is provided with a stepping magnet 1053 and a control relay 1055, shown in Fig. 10.

It should be noted, that the movements of the two numbering switches 655 and 662 are under the control of the registering switch 692, which is accomplished by a special way of connecting the contacts in the control levels of the three switches. Four consecutive contacts of switch 655 are connected to a set of conductors 1112 connected each to a group of 10 consecutive contacts in the row 2 of switch 692. 10 consecutive contacts of switch 662 are connected to a set of conductors 1109 connected to 40 contacts in row 1 of switch 692 in a periodical way. It will be described hereinafter that from the sixth position of switch 692 at every step of the latter, the unit-switch 662 is made to step likewise, while only at every tenth step of switch 692 the tens-switch 655 is moved on to the next position.

The operation of the telegraph system provided with broadcast register and the connection and arrangement of the apparatus incorporated therein, will be better understood from a consideration of the following description of the operation of the various pieces of apparatus incident to the setting up of station-to-station connections and broadcast connections of the kind referred to.

II. *Station-to-station call*

In the idle condition of station 301 a current of 5 ma., termed hereinafter the idle current flows through the reception loop 315 of this station, the circuit being as follows:

1. Battery, line relay 328, contact 322, resistance 317, station line 315, resistance 305 at the printer 301, contact 310, polarized relay 307, station line 315, resistance 318, contact 323, ground.

At the low value of the idle current the line relay 328 in the line termination does not attract the armature thereof, whereas the polarized relay 307 at the printer 301 has the contact 308 thereof in the shown position.

If the operator wants to extend a call, he presses his start key 304, thus bridging the resistance 305, whereupon the idle current increases so much, that the line relay 328 attracts the armature thereof. In consequence thereof a contact 329 of relay 328 applies negative test voltage to the relevant contacts in the *e*-level of a group of line finders, only one (332) of which is shown. A second contact 330 of the line relay 328 applies ground to a start relay 354 which is common to the whole group of line finders allotted to the call. Over a contact 355 of the start relay 354 the individual start relay 437 is energized, and the clutch magnet 439 of the shown line finder 332 is energized in a circuit:

2. Battery, clutch magnet coil 439, closing contact 438, back contact 413, back contact 408, ground.

Similar circuits are closed for the clutch magnets of all line finders multiplied with the station line termination.

The set of wipers of the line finders are clutched to a driving shaft, so that the line finders start and hunt for the calling station's connections. The station 301 is marked, as previously explained, by negative voltage to the relevant *e*-contact in the bank of contacts; let it be assumed that the line finder 332 reaches the marked position first. Then marking voltage extends over *e*-contact and *e*-wiper to a high resistance winding of high speed test relay 409 in the circuit:

3. Battery, resistance 331, front contact 329, *e*-wiper of line finder 332, conductor 350, high resistance winding of relay 409, ground.

Relay 409 actuates the armature thereof and thereby interrupts the energizing circuit of clutch magnet 439 at contact 413 so that the line finder 332 stops in this position.

At the same time test relay 409 closes at the contact 410 thereof a second circuit for itself over a low resistance winding. In consequence thereof the current through resistance 331 increases so much, that the calling station is marked as busy in the line finder multiple by the negative test voltage at the relevant *e*-contacts becoming insufficient for the energization of further test relays.

Relay 409 now starts the seizing of a register by closing a circuit at contact 411 of the register start relay 414, which is common to a group of cord finders, of which only one (446) is shown. A second contact 412 applies negative test voltage to the relevant contact in the *a*-level of the allotted cord finders, thus marking the calling cord circuit in the connection multiple of the cord finders. The start relays, such as 440, individual to each of the cord finders and the clutch magnets of the cord finders are energized; clutch magnet 442 for instance in a circuit:

4. Battery, clutch magnet winding 442, front contact 441, back contact 450, back contact 455, ground.

The cord finders start and hunt for the calling cord circuit. If it is supposed that cord finder 446 reaches the calling cord circuit first, the high speed test relay 449 thereof is operated in a circuit:

5. Battery, resistance 416, front contact 412, *a*-contact and *a*-wiper of cord finder 446, high resistance winding of test relay 449, ground.

Thus the circuit 4 is broken at contact 450, while contact 451 closes a circuit for the test relay 449 over the right hand low resistance winding thereof whereby the current increases so much, that the voltage to the relevant contacts in the *e*-level of the allotted cord finders becomes insufficient for the energization of further test relays.

When the cord finder is positioned a relay 454 for seizing a register is energized in a circuit over the test-relay contact 453. In consequence thereof a cord seizure relay 400 operates in a circuit over the *b*-wiper of cord finder 446 and front contacts 452 and 455 and closes the contact 405 which switches the *c*-wire of the cord circuit through to the repeater 421. The tongue 420 of the polarized receiving relay 419 in the repeater 421 is connected to the receiver 445 in the register over a back contact 432 of the relay 428 and the *f*-wiper of the cord finder 446.

A contact 408 of the switch through relay 400 applies ground to the cut-off relay 321 over the *d*-wiper of line finder 332, consequently the cut-off relay 321 is energized and reverses the current direction in the reception loop 315 at its contacts 322 and 323; contact 322 applies positive battery from the register via the wiper *d* of cord finder 446 and contact 430 to the upper wire of the loop 315, while the contact 323 is placed against negative battery. Line relay 328 is de-energized by the opening of back contact 322 and thus breaks at the contacts 329 and 330 the circuits for the test relay 409 and the start relay 354. In consequence thereof relay 414 is deenergized and breaks at contact 415 the circuit for the relay 440. Relay 454 is kept energized in a circuit over contact 456. Owing to the constant energization of the relays 400 and 454 the register is marked as busy at contacts 408 and 455, further operation of the clutch magnets 439 and 442 being made impossible.

In the above-described manner a circuit is prepared in the exchange by which selective signals transmitted by the operator of station 301 can be received by the register. The command to transmit selective impulses is given to the operator of the calling station by the start of the printer motor 314. The polarized relay 307 moves over the armature thereof at the reversion of the current in the reception loop by the contacts of relay 321. Subsequently the A. C. relay 309 is energized by an A. C. supply 313 and closes at the contacts 311 and 312 thereof the A. C. circuit for the printer motor 314 which is started.

The means for the selective positioning of the group selector 447 and the final selector 500 are only shown in principle in the drawings, for they are not part of the invention and, moreover, for the purpose of explaining the invention, it is not necessary to show their operation in full detail. It is therefore simply noted, that the selective signals in the system may be of any kind, e. g. a series of dialling impulses as well as five-unit permutation code signals, as usual in normal traffic, provided the receiver 445 in the register is adapted to receive these signals and to position marking means 443 in a registering device in accordance with the received selective signals.

Subsequently selectors, such as the group selector 447 and the final selector 500 are started and directed to selected positions under the control of the sequence switch and the positioned marking means 443 in the register, by means of the positioning apparatus 448 and 503, respectively, until at least the wipers *a–e* of the final selector 500 arrive on the terminals of the selected station line.

If the called station is busy, this condition is indicated by the energization of a cut-off relay 525. The register tests now via the *d*-wiper of the final selector 500 whether ground potential is applied to the relevant contact. In a way not shown in the drawing the holding circuit of the relay 454 is broken by the register, whereupon the repeater 421 is restored to idle condition, owing to the release of relay 400. Ground is cut off from the winding of relay 321, so that the current in the loop 315 is re-inverted, the relay 307 changing over the armature thereof and motor 314 being stopped as a sign, that the called station has been tested busy.

If the called station 535 is found to be disengaged, ground in the register is applied to the winding of the cut-off relay 525 via the *d*-wiper of the final selector 500, which relay is consequently energized. The change-over contacts 526 and 527 prepare the reception loop for the printer station 535 in the circuit:

6. Positive battery terminal in the repeater 421, tongue 420 in marking condition, front side change-over contact 432, wipers *a* of selectors 447 and 500, back contact 519, front contact 526, resistors 531 and 539, back contact 544, polarized relay 541, resistance 532, front contact 527, negative battery terminal.

The switch-over relay 428 is operated over a contact 457 of the sequence switch which is closed, when the called subscriber has been found to be disengaged. The tongue 420 is now connected via a front contact 432 of relay 428 to the reception loop of the called station.

The polarized relay 541 moves over the armature thereof as soon as it is energized by a low current flowing in the described direction, in consequence of which firstly the motor 547 is started in the manner analogous to that previously described for motor 314, and second the resistance 539 is bridged by the release key 540 in normal condition and the front side of contact 544, while at the same time the windings of the receiver magnet 536 are connected in the previously traced circuit 6.

Now the operator at station 535 may transmit at his transmitter 537 his signature signals, which are received and printed at the printer 301 in a way previously described, as a sign that the connection is established and that traffic may begin.

The register has now finished its operation and may be released. The circuit for clutch magnet 442 is prepared for a new operation by the de-energization of relay 454 in consequence of the interruption of the holding circuit thereof at contact 429. Relay 428 holds in a circuit over its own front contact 431 and the contact 407 of the cord seizure relay.

In the meantime the guarding relays 433 and 435 are energized upon the operation of relay 400. Armature 420 of polarized relay 419 is moved over to the positive terminal of battery, owing to the marking condition of the transmission loop of the calling station. As a result a path is completed for the relay 435, from positive telegraph battery over a contact 403 of relay 400, the winding of the guarding relay 435, to negative battery. At the same time, a circuit is completed from positive battery in the register over contacts 430 and 401 for the second guarding relay 433. After the called station is switched in, the energization is taken over by positive telegraph battery via the tongue 418 of relay 417. The relays 433 and 435 are slowly releasing relays and hold on the different telegraph signals, but are adapted to break the holding circuit for the seizure relay 400 at contacts 434 and 436, upon a closing signal from one of the connected stations. This release signal consists in an all-spacing period of e. g. 1 sec., and is transmitted by means of the stop keys 306 and 540. Thereby the tongues 418 and 420 are moved to negative battery and the relays 433 and 435 are short-circuited for some time.

III. *Station 301 calls for a broadcast connection*

Let it now be assumed, that the operator at station 301 wants to extend a broadcast call to a certain number of stations belonging to a special group.

The operator effects the call in a way similar to that for a station-to-station call, as previously described, pressing the start key 304 of his printer, thereby energizing the line relay 328, seizing a free cord circuit after starting and positioning a line finder and seizing a free register after starting and positioning a cord finder. A previously traced circuit for the reception of selective signals by the register receiver is established.

The receiver 445 of the register is arranged in such a manner, that upon the reception of certain predetermined selective signals, battery is applied to the *i*-wiper of the cord finder 446. These predetermined signals are assumed to be the selective signals for the conference register. If for instance, selective signals in a system are given as a series of line interruptions having the same duration by means of a dial, and under the control of each signal a marking switch is positioned in the register, each broadcast register in the exchange could be provided with a station number, similar to the call number of normal stations in the system. The marking means 443 must be arranged in this system in such a manner, that at a predetermined combination of positions of the marking switch, corresponding to the number of the broadcast register, battery is connected to the *i*-wiper of the cord finder e. g. over a series of arrangement of contacts of the marking switch, symbolized in contact 444. When this is the case, a current flows through a circuit:

7. Battery, *i*-wiper, cord finder 446, conductor 351, *f*-wiper of line finder 332, relay 335, brush *c* in position 0 or 1 of the sequence switch of the broadcast register, ground. Two facts may be noted in connection herewith:

The relay 335 is only connected to the relevant contact in the *f*-level of the line finders 332 for those stations which belong to one of the special groups of the exchange. If from any other station in the system a call is directed to one of the broadcast registers no relay such as 335 would operate and consequently no conference register would be seized, the cord circuit and the normal register in the exchange being restored to normal condition upon the release of relays 400 and 454 by the register in a way not shown in the drawings.

Furthermore, with respect to the broadcast register, the operation of relay 335, shows some analogy to the operation of the normal line relay 328 taken in connection with the operation of the normal exchange selecting means. The contact 338 applies ground to the multiple point 334, to which the relays such as 335, of all the stations are connected, which are enabled to extend a broadcast call, and which belong to one of the special groups. If, for instance, an exchange system has four special groups each having 40 stations associated therewith, only 10 stations in each group being entitled to extend a call in their own group, 40 stations have a relay, such as 335, arranged in their terminal circuit, those 40 relays being subdivided into four groups of 10 relays each, the latter being multiple-connected to the *c*-brush of the sequence switch in the corresponding broadcast register.

The contact 338, however, is only closed if the relevant broadcast register is found in disengaged condition, in which case the sequence switch takes the position 0 or 1. In this manner the broadcast register is guarded against fresh calls while the same has not yet been restored to normal condition.

The relay 335 prepares at the contact 337 thereof the following test circuit for the finder 600 of the subscriber:

8. Ground, contact 707 of the B brush of the sequence switch in the position 0 or 1, relay 700, *e*-wiper of station finder 600, conductor 344, front contact 337, switch-over relay 324, battery.

At a second contact 336 the relay 335 starts the station finder 600, the clutch magnet 708 of which is energized in a circuit:

9. Ground, front contact 336, conductor 345, back contact 702, winding of clutch magnet 708, battery.

Simultaneously the start relay 744 of the sequence switch 753 is energized in a branch circuit leading from back contact 702 over the winding of start relay 744 to battery, thereby completing the following energizing circuit for the stepping magnet 750 of the sequence switch:

10. Ground, front side of change-over contact 746, back contact 748, stepping magnet 750, battery.

In consequence thereof the brushes of the sequence switch are moved one step forward.

At the contact 752 the stepping magnet 750 prepares the following circuit for the operation of a relay 747:

11. Ground, front contact 752, back contact 742, relay 747, battery.

When the sequence switch brushes have the position 1, the relay 747 is held in a circuit:

12. Ground, front contact 745 of start relay 744, contact 1 in the A-level of the sequence switch, A brush, front contact 749 of relay 747, back contact 742, winding of relay 747, battery.

In consequence thereof, the circuit 10 is interrupted at the contact 748, so that the sequence switch keeps the position 1 for some time.

The subscriber finder 600 meanwhile hunts for a battery-marked contact in the *e*-level. Upon reaching this contact, a previously traced test circuit 8 is completed at the wiper *e*, in which the switch-over relay 324 and switch-through relay 700 are energized in series.

With the change-over contacts 325 and 326 the relay 324 disconnects the calling station's line termination from the contacts in the banks of the line finders and connects them to the relevant contacts in the *a*- and *b*-levels of the contact bank of the subscriber finder 600. Moreover relay 324 bridges the contact 337 in its energizing circuit with the contact 327 thereof, to prevent a release of relay 324 upon the de-energization of relay 335 in further positions of the brush *c* of the sequence switch.

The balance resistance 333, which is necessary for the cooperation of a single current line with the polarized reception relay in the repeater, is connected to the relevant *c*-contact of subscriber finder 600 via a conductor 342.

The switch-through relay 700 acts as a test relay for the subscriber finder 600 by breaking the circuit of the clutch magnet 708 at the contact 702, so that the subscriber finder stops. Also the relay 744 releases its armature and breaks the contact 745 in the holding circuit 12.

At contacts 704–706, respectively, the wipers *a*, *b* and *c* of the subscriber finder 600 are connected to the polarized relays 602 and 604 in the repeater in a certain way, dependent on the nature of the calling station's line.

Obviously the previously described energizing circuit of the cut-off relay 321 is interrupted by the restoration of the cord circuit and the line finder 332; this circuit is therefore taken over by the broadcast register after the operation of the relay 700 in the circuit:

13. Ground, front contact 703, *d*-wiper of station finder 600, conductor 343, cut-off relay 321, battery.

The junction circuit in the exchange and the normal register are now restored to normal condition. The adaptation of the repeater shown in Fig. 7 to the calling line will be now explained first with reference to Figs. 13–15 which show diagrammatically the telegraph repeating relays 602, 604 and the manner, in which they must be connected for cooperation with the various kinds of lines.

Fig. 13 shows the repeater relays 602, 604, as they are arranged for cooperation with a local single current line having separate reception and transmission loops. The output side of the relays is arranged for cooperation with the receiver and transmitter in the broadcast register, the contact 640 symbolizing the transmitter, shown in Fig. 6 more elaborately, and 609 being the magnet coil of the receiver previously described.

Fig. 14 shows the arrangement of the repeater relays 602, 604 when cooperating with a local station having the reception magnet coils 302 and the transmitting contacts 303 arranged in series in a loop 1400.

For both kinds of single current operated lines it is necessary to provide the line termination with a balance resistance 333, for reasons previously described. It is noted that in the arrangement of Fig. 14 the junction of the windings of relay 602 is connected to the tongue 605 of relay 604. In marking condition this tongue is in contact with positive battery terminal, and consequently the current through the upper winding of relay 602 is interrupted. When signals are transmitted by the register, the armature 605 is moved over to negative terminal of battery at spacing impulses and the energization of the upper winding is now twice as strong as that of the lower or balancing winding. However, simultaneously the current direction and consequently the energization of the balancing winding is reversed, so that the energization of relay 602 remains constant and the signals transmitted by the register are not transmitted backwards to the same.

Fig. 15 shows the arrangement of the repeater, when cooperating with a districts' station trunk line. The output side of the repeater 603, 604 is connected to the register transmitter and receiver in a way similar to that shown in Figs. 13 and 14. However, the junction of the windings of relay 602 is disconnected, the balancing resistance 333 is not provided in the trunk line terminations, and the lower winding of relay 602 is grounded. Double current signals are transmitted by the tongue 605 to a reception relay 1502 in a distant repeater, and relay 602 is magnetized in opposite directions by double current impulses of signals, transmitted by the tongue 1506 of the relay 1505 of the distant repeater.

The adaptable repeater shown in Fig. 7 is normally adapted to cooperate with a calling trunk line as shown in Fig. 15. If the adaptation relays 709 and 716 are in non-energized condition, the *a*-wire is connected to the tongue 605 in the following circuit:

14. *a*-Wiper of station finder 600, contact 706, resistance 724, back contact 720, choking coil 726, tongue 605.

The *b*-wire is connected to the upper winding of relay 602 as follows:

15. *b*-Wiper of station finder 600, contact 705, control relay 722, back contact 719, relay 602.

It should be noted, that the slowly operating control relay 722 cannot operate on the double current of 10 ma.; it operates only when the current has a value between 10 and 40 ma.

The junction of the two windings of relay 602 is disconnected at a contact 714 of the relay 709, while the lower winding is connected to ground via a contact 713 of the same relay.

In this condition the repeater may cooperate with a calling district station on the input side thereof and the broadcast register on the output side thereof.

If, however, a single current local subscriber is calling for a broadcast connection, first the relay 709 is energized in a circuit:

16. Ground, balance resistance 333, conductor 342, wiper *c* of station finder 600, front contact 704, back contact 710, relay 709, battery.

Relay 709 holds itself over the contact 712 thereof which is adapted to be closed before contact 710 is opened, and the B-brush of the sequence switch in positions 1–11, inclusive.

If now the calling station is arranged with a common reception and transmission loop, the operation of relay 709 is followed by the operation of relay 716 in a circuit:

17. Ground, back contact 723, closing contact 711, relay winding 716, battery.

With relays 709 and 716 energized the repeater is adapted to cooperate with a local station connected to the exchange by a single current two wire line. The *a*-wire is connected to the upper winding of relay 602 as follows:

18. *a*-Wiper of station finder 600, contact 706, front contact 719, relay 602.

The *b*-wire becomes disconnected from the repeater relays owing to the change-over of contact 719, but is connected to positive battery via a closing contact 718 and a resistance 721.

The second winding of relay 602 is now connected to the balance resistance 333 in the circuit:

19. Ground, balance resistance 333, conductor 342, *c*-wiper of station finder 600, contact 704, front side contact 710, front side contact 713, second or lower winding of relay 602.

If, however, a local line with separate transmission and reception loop is connected to the repeater, the positive battery voltage connected to the *b*-wire extends over the winding of a slowly operating relay 722 in a circuit:

20. Positive battery, resistance 721, front contact 718, relay 722, contact 705, *b*-wiper of station finder 600, conductor 341, contact 325, transmission loop 316, negative battery.

Consequently some moments after the operation of relay 716, contact 723 breaks the energizing circuit of relay 716 again thereby completing the adaptation of the repeater for cooperating with the calling four-wire single current line. The *a*-wire is now connected to the tongue 605 of relay 604 over the circuit 14, previously traced. The *b*-wire is connected to the upper winding of relay 602 in the previously traced circuit 15 over the relay winding 722. Finally the balance resistance 333 is connected to the lower winding of relay 602 over two operated change-over contacts of the relay 709. The arrangement is now in the position according to Fig. 13.

It should be noted, that relay 722 is arranged in the station's transmission loop 316. Relay 722, therefore, should have a sufficient time delay in releasing the armature thereof in order to prevent a new energization of relay 716 owing to the closure of the energizing circuit of this relay at back contact 723. For a signal in the normal five unit code having five mark elements the transmission loop current is interrupted for 120 milliseconds. The relay 722 should safely hold its armature for a line current interruption of about 250 milliseconds.

For a fuller description of the arrangement and the operation of adaptable repeaters such as the one hereinbefore discussed, reference is made to the copending application Serial No. 152,451, filed March 28, 1950, now U. S. Patent 2,611,815 dated September 23, 1952, for Signalling System.

As the drawings show the calling station 301 provided with a single current line with separate transmission and reception loops to the exchange, the relays 709 and 716 will be supposed in the further description as energized and de-energized, respectively, the arrangement of the repeater 601 being as shown in Fig. 13 and as indicated in heavy lines in Fig. 7 of the drawings.

The relay 700 prepares meanwhile an energizing circuit for the slowly operating relay 733 which, however, cannot be operated until after relay 602 has been switched into the calling station's line and has moved over the armature thereof to positive battery, which is the marking condition of the relay 602. Then relay 733 is energized in the circuit:

21. Positive battery, tongue 603, contact 701, relay 733, negative battery.

The relay 733 is so slowly releasing, that it holds the armature thereof when the various telegraph signals are transmitted by the tongue 603, the time delay in the release of relay 733 being about 200–250 milliseconds. Relay 733 closes at the contact 734 thereof a circuit for the relay 738, the release of which is time delayed by an amount which is large as compared to that of relay 733, e. g. by 3–5 seconds, for reasons which will be more fully explained hereinafter.

The contact 741 of relay 738 connects the armature 603 to the receiver, shown in Fig. 8 over a circuit:

22. Tongue 603, front contact 701, front contact 741, back contact 690, conductor 730, contact 838 of a relay 837 in the receiver.

The other contacts 739, 740 and 741 of the relay 738 prepare circuits for controlling the stepping of the sequence switch in such a manner, that the same does not stop on a grounded contact, but on a non-grounded one in the arch A of the switch.

The sequence switch 753 in the positions 1 and 2 prepares at its brushes B–H some parts incorporated in the broadcast register for the functions they will have to perform. In the position 1, for instance, the switches 641, 648 and 692 are locked in the homing position thereof if these positions are taken. When not in homing position the stepping switches 641, 648 and 692 are brought into the homing position after a following step of the sequence switch 753 to the position 2. This will be further explained, when the operation of these switches is described.

After the repeater is adapted to the calling line, the energization of relay 738 causes the sequence switch 753 to step from position 1 to 2. Start relay 747 was holding itself in the previously traced circuit 12 over the contact 1 in the A-level of the sequence switch, which circuit is now broken at change-over contact 742. However, simultaneously a new energizing circuit is prepared for the relay 747, over two front contacts 742 and 739 of relay 738.

23. Ground, brush B in position 1, front contact 739, brush A in position 1, back contact 751, front contact 742, relay 747 to battery.

This circuit 23 will be closed in the positions 1, 3, 5, 9 and 11 of the sequence switch since the relevant contacts in the A-level are through-connected and the contact 743 applies ground to the circuit in all positions 1–11, inclusive, of the B-brush.

In consequence thereof the circuit 23 for the energization of relay 747 is completed, whenever ground is found by the A-brush of the sequence switch at a contact, and it is interrupted during those times, when the A-brush moves from a preceding contact to a following contact in its level, and moreover, when the following contact is not connected to ground.

Now stepping magnet 750 is energized in a circuit:

24. Ground, front contact 740 of relay 738, front contact 748 of relay 747, magnet 750, battery.

As a result thereof the sequence switch 753 steps to the position 2, thereby breaking circuit 23, and deenergizing relay 747, in consequence of which also the step magnet 750 is de-energized. If now ground were connected to the contact 2 of the A-level, the play could start again, first energizing relay 747 once more, therewith closing the circuit 24, etc.

However, to the contact 2 of the A-level ground is connected over a series arrangement of three front contacts 758, 761 and 762, operated by relay windings 1018, 1017 and 1204, respectively. These relays, as will be more fully explained below, are energized, when under the control of contacts of the sequence switch in position 2 the stepping switches 641, 648 and 692 arrive in the homing positions thereof, as a sign to the sequence switch that the necessary preparatory operations are closed and stepping may go on.

In a way similar to that described, upon closure of the three contacts 758, 761 and 762, relay 747 and magnet 750 operate, stepping the sequence switch to position 3, and further to position 4, as the operations are repeated, when ground is applied to a contact in the A-level.

Before describing now in greater detail the operation and arrangement of the various parts of the broadcast register, reference is made to Fig. 6, in connection with which first a general description of the manner of cooperation between calling station and broadcast register will be given.

IV. *Consultation of the calling station by the broadcast register*

Let it be assumed now, that in a previously explained manner a station 301 is connected to the repeater 601 of the conference register, that the switches 641, 648 and 690 have been restored to their homing positions in the position 2 of the sequence switch and that the sequence switch has stepped to the position 4, in which the same is momentarily locked.

The condition of the conference register is now such, that a consultation of the operator of the calling station with respect to his desires may be started.

The problem which is to be solved by the broadcast register is as follows:

The operator at station 301 wants to be connected to a number of particular printer stations being part of a special group. For this purpose he may only make use of the normal printer apparatus at his station, while in the exchange of the telegraph system a number of selective switching operations have to be performed, according to the operator's desires.

In manually operated systems the switchboard operator in the exchange asks the operator of the station for all the particulars about the desired connection and afterwards performs the necessary switching operations for the setting up of the connection in accordance with the printed answers of the operator of the station.

The broadcast register according to the present invention has an analogous operation, and is to be considered as an automatically operating switchboard operator. It inquires after the operator's desires by transmitting subsequently a number of questions to the printer at the station with respect to the stations which are to be connected in the broadcast connection, and to the manner in which this is to be done. To each question the calling operator answers by means of his transmitting printer. The conference register receives and registers the operator's reports and finally controls the selective switching operations in accordance with the registered commands.

When describing the arrangement shown in Fig. 6, it has been noted, that the signals are in the normal start stop five unit code, so that the teleprinter apparatus used in the system according to the invention need not be adapted to the special purposes described herein.

However, in order to simplify the automatical apparatus needed in the broadcast register for the above-described consultation, it is desirable to make the questioning and the answering signals part of a special code known to the operators of the system.

The broadcast register first sends a message to the station of the operator inquiring whether it is thought necessary to disconnect any busy stations from their call and to connect them to the broadcast arrangement. Furthermore the broadcast register sends a message inquiring about the operator's desire, whether all the associated stations or only particular stations of the special group are to be connected to the calling station, and if the answer to the latter question is positive, which particular stations are desired by the operator to be connected to his call. The first two questions, may be transmitted in the form of an interrogation point which is represented in the five-unit code by the signal X00XX if the operator knows from his instructions what is meant with the first and second interrogation point. The inquiries about each of the associated stations, which are necessary only in the event that some associated stations are not wanted, may be put in the form of transmission of the numbers of the relevant stations. The conference register successively transmits the numbers of all the associated stations, and waits between the transmission of every two numbers for an affirmative or negative answering signal.

In telegraph systems for large public traffic the numbers of the stations in the system will be large, so that it is desirable to provide the stations associated with the broadcast group with two numberings, viz. the normal number used in public traffic and a separate number, by which they are marked in the broadcast register. By way of example, in a broadcast group having 40 stations, the separate numbers should be 10–49, inclusive.

It should be noted, that in the above proposed code all inquiries are such, that the operator is expected to reply only with "yes" or "no"; these replies may be done in a code by taking the signal "+" (code: X000X) as the affirmative answer and the signal "−" (code: XX000) as the negative answer.

The stepping switch 641 is started first and steps from the homing position thereof to the first operating position and stops there. The wipers 642, 643, 644 and 646 are now at ungrounded contacts, whereas only the wiper 645 is at a grounded contact (Fig. 10). A start impulse is now given to the transmitter 640, which transmits in a way described hereinafter, the signal determined by the combination of grounded contacts in the levels of switch 641. This signal (000X0) is the control signal: "carriage return" for the printer 301. Thereupon the switch 641 steps to the following position, whereby the transmission of the following signal is prepared. A next start impulse to the transmitter 640 effects the transmission of the control signal (0X000) "line feed" to the printer 301. The operations are repeated, so as to transmit successively the signals: "carriage return," "figure shift," "?," "space."

The calling operator has now the interrogation mark printed at his printer. This first printed signal means: "Do you want the busy subscribers to be disconnected on behalf of your call?" The operator is now expected to transmit one of the signals "+" and "−" by pressing the corresponding key at his keyboard. As previously described the signal is received by the receiver 633, the relay 631 being energized after a positioning of the reception code rails in the event the signal is "+" in a circuit:

25. Ground, front contact 628, contacts 616—615, 621—620, 623—622, 617—618, 627—626, conductor 630, relay 631, battery.

On the contrary, the relay 32 is energized if the signal is "−," in a circuit:

26. Ground, front contact 628, contact springs 616—615, 621—620, 623—622, 618—619—624—625, conductor 629, relay 632, battery.

Both relays 631 and 632, when operated, complete at contacts (not shown) an energizing circuit for the stepping magnet of the register switch 692, whereby consequently after reception of each reply signal from the station 301, the switch 692 steps from position to position. Furthermore, whenever the reply signal is such, that the relay 631 is energized by applying ground to conductor 630, simultaneously one of the registering relays 6003, 6006, 6008, etc. is energized, in a circuit:

27. Ground, front contact 628, contact springs 616—615, 621—620, 623—622, 617—618, 627—626, conductor 630, back contact 689, wiper 697 of step-by-step type switch 692, a contact in the fifth level cooperating with wiper 697, winding of the registering relay connected to said contact, battery.

Thus, the registering relays 6003, 6006, 6008 are energized, whenever a corresponding signal from the calling station is received, and hold themselves over contacts 6005, 6007, 6011, respectively, after the receiver 633 has been restored to normal for the reception of a fresh signal.

In a manner more fully to be explained hereinafter, the register switch 692 is positioned at the contacts belonging to the registering relay 6003 at the moment when the reply to the first inquiry is transmitted by the station 301. In the event a signal "+" is received the relays 631 and 6003 are energized. Relay 6003 inverts the armature thereof and closes a holding circuit at contact 6005. Afterwards the relay 631 makes the switch 692 step to the following position and is then de-energized by the interruption of its circuit at the contact 628.

In the event the reply signal is "−," the relay 632 is energized and no ground is applied to the conductor 630, in consequence of which relay 6003 remains de-energized. Relay 632, however, makes the switch 692 step to the following position and is then de-energized by the interruption of its circuit at contact 628. The first reply is now indicated by the energized or de-energized condition of the first registering relay 6003.

Now the step-by-step switch 641 makes a step again and in a manner similar to that described hereinbefore, transmits at the contacts of its next four positions successively the following signals to the printer 301; "comma" (00XX0); "space," (00X00); "?" (X00XX); "space." In the next position the switch stops and the receiver 633 waits for the reply to the second introductory question from the station 301. The second interrogation mark means: "Do you want all the stations to be connected to your broadcast connection?"

In the way previously described, an affirmative reply is indicated by the energized condition of the relay 6006. If the relay 6006 is energized as a sign that all the stations should be connected, the conference register provisionally terminates its operations by switching in all the subscribers in a manner more fully to be described hereinafter. If, however, relay 6006 is not energized after the introductory questions have been answered by the calling station, the consultation between the conference register and the calling station is started, concerning the stations which should be switched in. In this event the step-by-step switch 648 is started by the register and firstly transmits a number of control signals for the teleprinter 301 in a way similar to that explained hereinbefore: "carriage return," "line feed," "carriage return," "figures shift."

In the next two consecutive positions of the switch 648 the corresponding contacts in the contact-levels of the switch are connected to corresponding wipers of two further step-by-step switches 655 and 662. It has been noted in the description that the system shown in the drawings comprises 40 stations for broadcast purposes numbered 10–49; also it is made apparent, that four successive sets of five contacts in the five contact-levels of switch 655 are grounded in such combinations as to transmit the figure-signals 1–4, respectively in the associated positions of the wipers 656—660. Furthermore ten successive sets of contacts of the switch 662 are grounded in combinations corresponding to the figure signals 0–9, respectively. Moreover the contacts in the right hand levels of the switches 655 and 662 are connected by a particular way of mounting to the contacts in the first two levels of the switch 692, so as to make the switch 662 step to a next position, whenever the switch 692 performs the same operation, and to make the switch 655 step to a next position only after ten successive steps of switch 692. Apparently, each position of the register switch 692 corresponds to a particular set of positions of the numbering switches 655 and 662. After the transmission of the control signals mentioned before the stepping switch 648 stops for a while at the contacts connected to the wipers 656—660 of the numbering switch 655. These wipers are now under control of the register switch 692 associated with the contacts comprising in their grounding combination the figure signal 1. This signal (XXX0X) is transmitted in a previously described manner. Then the switch 648 is started again and steps to the next position, in which its wipers are associated with the set of contacts connected to the wipers 663—667 of the switch 662. These wipers are now under the control of the register switch 692 associated with the contacts comprising the figure signal 0. This signal (0XX0X) too is transmitted. In this way the station's operator is asked about his desires concerning the first station of the group, having now printed the broadcast number ten of the first station on a new line.

The switch 648 terminates its operation for the time being by transmitting in the next position the "space" signal to the printer 301. Then the register waits for the reply.

The calling station is supposed to transmit the answer in a previously described code-form, viz. the signal "+," if connection with the station 10 is desired, and the signal "−" if it is not desired. The reception of the reply signal effects the energization of one of the relays 631 and 632 and the operation of the associated registering relays such as 6008, only in the event the signal is affirmative. Then at a contact of relay 631 or 632 the stepping magnet 1222 of switch 692 is operated (Fig. 12), and register switch 692 steps to the next position.

Simultaneously the switch 662 automatically steps to the next position comprising in the contact-grounding combination thereof the figure signal 1.

Then the switch 648 is started again and transmits in the last two positions thereof the signals: "comma" and "space" to the printer 301, while after that the switch is moved again to the first set of contacts in the five levels thereof. However, it is not necessary to repeat the control signals transmitted to position the printer 301 before inquiring, after the desired station was started. These control signals are "carriage return"; "line feed"; "carriage return" and "figures shift." The number of the next station, however, could be printed directly in the same line, only a comma and a space being inserted between the reply signal "+" or "−" and the number of the next station. As more fully described in connection with Fig. 10, a relay 1022 is provided in the register and adapted to be energized after the first, the eleventh, the twenty-first, etc. station is inquired after, and to be released whenever the tenth, twentieth, etc. station has been inquired after.

Owing to the operation of the relay 1022, the switch 648 does not stop in the first six positions and stops only in the positions 7 and 8, in which the tens switch 655 and the unit switch 662, respectively, are connected to the transmitter 640 so as to transmit the broadcast number 11 of the second station to the printer 301. If the calling station wants to have the station 11 connected to the broadcast connection, it transmits the signal "+," so that the receiver relay 631 in the register and the associate registering relay are energized, and the switches 692 and 662 step to the next position for the inquiring about station 12.

This operation is repeated until the switching in of the station 19 has been inquired after. Then not only the registering switch 692 and the unit switch 662, after the reception of the reply signal, are moved to a next position, but also the tens-switch 655 associates the wipers 656—660 thereof with a next set of contacts, representing the signal "2." The relay 1022 is de-energized, in consequence of which the switch 648 transmits before the number signals "20" the control signals mentioned hereinbefore. The carriage of the printer is moved back, and a new line is used for inquiring after the switching of the following ten stations.

When the calling station has transmitted its reply concerning the switching of the last associate station, a relay 1228 shown in Figs. 10 and 12 and connected to one of the last contacts in the third level of switch 692 is energized, thereby locking at a contact 1058 shown in Fig. 10, switch 648 in a particular position. The desired stations are connected by means of the switch-over relay 516 in their line termination to the conference register. More particularly, the registering relay 6008, which is assumed to be associated with the station numbered 37, when energized during the consultation, has prepared at the contacts 6009 and 6010 thereof two energizing circuits for the switch-over relay 516, viz. the circuits:

28. Ground (Fig. 5), sequence switch c-brush in positions 5 and 6, junction point 529, cut-off relay contact 528, conductor 553, contact 6010 (Fig. 12), conductor 550, upper winding relay 516 (Fig. 5), battery; and 29. Ground (Fig. 12), sequence switch brush c in positions 5 and 6, front contact 6004 of register relay 6003, junction point 6012, contact 6009, conductor 551, lower winding switch-over relay 516 (Fig. 5), battery.

When the consultation is finished at the energization of relay 1228, the sequence switch steps from position 4 to position 5 in a manner more fully to be described hereinafter. Thereby ground is applied to the junction points 529 and 6012, respectively, of the circuits 28 and 29 traced hereinabove, so that the switch-over relays of the called stations may be energized in one of the circuits 28 and 29. However, in the event the station 37 is desired to be connected to the broadcast connection, in consequence of which the relay 6008 is operated, and this station is busy on the moment the conference call is extended, the circuit 28 is broken at a contact 528 (Fig. 5), as the cut-off relay 525 of the line termination is energized during the time a station-to-station call is going on. The second circuit 29, by which the station's switch-over relay 516 is energized, is only completed, if the relay 6003 (Fig. 12) has attracted the armature thereof during the consultation, as explained hereinabove. The relay 6003 is energized only if an affirmative signal is transmitted by the calling station, in reply to the first interrogative signal: "Do you want the busy stations to be switched in?" The relay 516 switches over the line termination of the station 535 only if this station is not busy at this time, or if the station is busy, but is desired to be disconnected from a going-on call and to be connected to the broadcast arrangement.

In these events the a-wire of the reception loop of the called station 535 (Fig. 5) is connected at the contact 519 of relay 516 to the tongue 507 of the broadcast repeating relay 506 and the b-wire of the transmission loop is connected to the upper winding of relay 510 at a contact 518, while contact 517 disconnects the cut-off relay 525 from the d-level of contacts of the final selector 500 and prepares an energizing circuit for this relay as follows:

30. Ground (Fig. 5), brush G of the sequence switch in position 6, front contact 517, winding relay 525, battery.

At contact 520 a holding circuit for relay 516 is prepared, which is only closed in the positions 5 and 6 of the sequence switch. Assuming now that the station 535 is not busy at the moment at which the same is called for a broadcast connection, the stepping of the sequence switch to the position 6 completes the circuit 30 so that the relay 525 is energized and inverts the current in the reception loop of the called station in the following circuit:

31. Positive battery, armature 507, coil 508, contact 519, contact 526, resistance 531, resistance 539, contact 544, polarized relay 541, resistance 532, front contact 527, negative battery.

Thus, relay 541 moves over the armature 542 thereof and energizes thereby the A. C. switch-on relay 543. The printer motor 547 starts as a sign that the station is called, and at contact 544 the reception magnet coils 536 are switched into the reception loop.

Assuming that the station 535 is busy, but is desired to be connected to the broadcast connection compulsorily, the cut-off relay 525 is released at the moment the switch-over relay 516 operates the armature 517 thereof, thereby disconnecting ground from the conductor 501 in the final selector circuit. Owing to the re-inversion of the current in the transmission loop the printer station 535 is restored to normal condition, the printer motor 547 being stopped. Also, relay 417 (Fig. 4) in the telegraph repeater 421 moves back the armature thereof to negative battery, owing to which the slowly releasing guarding relay 433 at the contact 434 thereof restores the junction circuits in the exchange and the station on the other side of the call to normal in a way previously explained.

The station 535, however, is re-started, when the sequence switch steps into the next position 6, owing to the renewed operation of the cut-off relay 525 in a way previously explained.

As the holding circuit for the registering relay 6008 over an own contact 6011 is completed at a contact of the sequence switch, which is only closed by the brush c in the positions 4, 5, 7 and 8, the relay 6008 is released, when the sequence switch steps to the position 6. However, this holds only for the relays belonging to stations which were desired to be switched in, but are not connected in fact, owing to the circumstance that they were busy and the registering relay 6003 had not been energized in order to disconnect the busy stations from their calls.

After the reception loops of the called stations are connected to the tongues of the individual polarized transmission relays, such as relay 506, the stepping switch 641 is re-started and transmits first a number of control signals: "carriage return," "line feed," "carriage return," "characters shift." A relay 1033, more fully represented in Fig. 10 of the drawings, is energized after the last station number is transmitted by the numbering switches 655 and 662, and connects at a contact 608 (Figs. 6 and 7) thereof the transmission relays like 506 of all the seized stations to the tongue 605 of the transmission relay 604 in a path:

32. Tongue 605 of transmission relay 604, conductor 607, front contact 608 of relay 1033, contact 691 of relay 688, conductor 504, individual transmission relay 506.

In consequence the signals, now transmitted by the transmitter 640, in cooperation with the repeater 601, are received by the calling station, as well as by the called stations. The stepping switch 641 continues stepping and transmits the characters: b.r.o.a.d.c.a.s.t.m.e.s.s.a.g.e., after the control signal: "figure shift," a punctuation mark and at last the signal: "characters shift." Then the switch 641 terminates the operation thereof, while at one of the last positions the relay 688 is energized so as to disconnect the individual transmission relays from the tongue 605 at the contact 691 thereof and to connect the same by its contact 690 to the tongue 603 of relay 602 over which the broadcast-traffic will be set up. Now the broadcast-connection is established, the calling station's transmission loop terminating in the repeating relay 602, the tongue of which is connected to a number of repeating relays individual to the called stationus, so as to retransmit signals transmitted by the calling station to the called stations.

Thus, after having obtained an announcement that a broadcast-message may be given, the calling station starts the transmission of his message, as a rule by printing first the date, the time and the serial number of the message. The sequence switch in the broadcast register is locked in the position 6 for the time of the massage.

V. *Reporting back*

When the call is to be finished, the calling station gives a closing signal by pressing the release key thereof for a short time.

In a manner fully to be described hereinafter, the sequence switch, under control of the closing signal, steps to the next position 7. In this position the grounded contact 522 of the sequence switch brush G is no longer closed, owing to which the energizing circuit of the cut-off relay 525 is interrupted. The current in the reception loop of the station 535 is re-inverted at contacts 526 and 527, and consequently the polarized relay 541 moves back the armature thereof, thereby effecting the release of the printer motor and the cutting off of the coils 536 of the receiving magnet. However, for a purpose which will be explained presently, immediately after the closing signal is received, the operator at station 535 may operate back report relay 510 individual to his station to show that he has received the message well. He may operate the back report relay 510 by admitting for a moment the marking current in the station's transmission loop, which loop is usually only completed in case the station 535 intends to transmit in normal traffic. The circuit is as follows:

33. Positive battery, upper winding of relay 510, contact 518, resistance 533, transmission loop in marking condition, resistance 534, negative battery.

Back report relay 510 closes a holding circuit at the contact 511 thereof, the H-brush of the sequence switch in position 6 closing a contact 515.

The sequence switch in position 7 controls in a way more fully to be described hereinafter the re-started switch 692 which is in such a position that the reporting back can be started. This position is identical to the position taken by the switch 692 at the moment at which the consultation relating to the wishes of the calling station concerning the switching-in of the numbered stations was started. The numbering switches 655 and 662 simultaneously move on, until they take the starting positions thereof. After the switches have been re-positioned the sequence switch steps into the position 8 in which the stepping switch 648 starts again the transmission of the numbers of the various stations, in cooperation with the numbering switches 655 and 662 and the register switch 692, in a way similar to that previously explained.

However, the switch 648 after having transmitted a number does not stop to wait for the operator's reply, as previously described, but continues stepping, and transmits at a following set of contacts a signal to the calling station, the nature of which is dependent on the operative or inoperative condition of the relays 698 and 6000. The contacts of these two relays apply ground to a set of five contacts in the various levels of the switch 648, in order to transmit a signal to the station 301 in the associate position of the switch 648. The combination of grounded and not grounded contacts depends on the question, whether the relays 698 and 6000 are operated or not. Inoperative relays 698 and 6000 apply ground to the wipers 649 and 650 only in the associate position; the signal is therefore XX000 (—). In the event, that only the relay 6000 is operative, the signal transmitted in the relevant position is X0XXX (/). With both relays operated the switch 648 in the associate position transmits the signal X000X (+). A fourth combination consisting of relay 698 being operative and relay 6000 being inoperative is not possible, as a station such as 535, can operate relay 510 in the event relay 516 inverted the contact 518, which however, relay 516 is able to do only if the relevant registering relay 6008 is operated before.

The switch 648 thus transmits a new list of station numbers to the printer 301 after this station has given the closing signal, each station number now being accompanied by one of the signals —, / or +. Assuming, that the station 535, having the broadcast number 37, has received the message well, which fact has been reported to the broadcast register by operating the relay 510, a front contact 512 of relay 510 applies ground to the associate contact in the fourth level of contacts of the registering switch 692. Thus the switch 692 energizes the report back relay 698 when reaching the associate contacts of stations 37 in a circuit:

34. Ground, contact 512, conductor 549, associate contact in the fourth level, wiper 696, relay 698, battery.

It was pointed out hereinabove that the registering relay 6008 is released in the position 6 of the sequence switch, unless a holding circuit is completed before at a contact 521 of the switch-over relay 516. Apparently the registering relays such as 6008 show in the operative condition thereof at this stage, whether a station has been really switched in or not. A circuit over a sequence switch brush C contact 6013 takes over the energization of relay 6008 by the path 34 before relay 516 releases owing to the stepping of the sequence switch to the next position 7.

In the meantime, upon reception of the closing signal in the position 7 of the sequence switch, the switch 641 has stepped to the last position thereof, thereby breaking the energizing circuit of the relay 688. The connection between the repeating relays 602 and 506 is now cut off, whereas at a contact 689 an operating circuit for the report back relay 6000 is prepared. This circuit is completed at a contact 6011 of the registering relay 6008, when the register switch reaches the contacts associated with the station 37.

Both report back relays are thus operated when the register switch 692 steps from the contacts of the station 36 to the contacts associated with the station 37. The tens switch 655 remains in the position it takes before, whereas the unit-switch 662 steps into the next position. The switch 648 now makes a cycle, transmitting in the position 7 the figure 3, in the position 8 the Figure 7, in position 9 a space-signal, and in the position 10 the signal "+" as a sign, that station 37 has been connected in and has received the message well.

Assuming that the next station 38 has been connected to the broadcast connection, but has received a disturbed message, the relay 510 will not be operated, in consequence of which relay 698 will not operate in the next position of the switch 692; the number 38 at the station's printer 301 is followed by the signal "/".

Assuming finally, that the station 39 has been called but was not switched in, which is only possible in the event the relay 6006 has not been energized in reply to the second introductory question, both relays are inoperative in the associate position of the switch 692 and the number 39 at the printer 301 of the calling station is followed by the signal "—".

The same will occur in positions of the switch 692 corresponding to stations the switching in of which was not even desired by the calling station. It will be clear, that by the described method of reporting back the calling station is provided with a detailed and surveyable report regarding the real composition of the connection.

The report-back operations are finished by the magnetization of a relay 1231 shown in Figs. 10 and 12 which is connected to a contact of the third level of the register switch 692. The sequence switch is now moved on from the position 8 to the position 10. In this position, in a way which will be more fully described hereinafter, the stepping switches 641, 648, 655, 662 and 692 are set back in the home position thereof. Then the sequence switch returns to the home position 0 via the positions 11 and 12 in which position the broadcast register is restored to normal and may be seized for a fresh call.

The calling station is disconnected in the position 12 of the sequence switch. The test circuit 8, in which the switch-over relay 324 in the line-termination and a switch through relay 700 in the conference register are energized, is broken at the brush B of the sequence switch in position 12. The station's line is again connected to the line finder multiple, whereas the energizing path of the cut-off relay 321 is interrupted in the broadcast register at a contact 703 of relay 700. The re-inverted reception loop current can now effect the restoration of the printer 301 in a way previously explained whereas the line relay 328 is switched into the reception loop for a fresh call.

VI. *Detailed operation of the apparatus*

Considering now the operation of the broadcast register in greater detail more particularly, reference is made to the Figs. 7–12 of the drawings. It has already been explained heretofore, in what way the repeater shown in Fig. 7 is arranged so as to cooperate with the station line connected thereto, the sequence switch 753 being positioned in the position 4 thereof.

Furthermore it has been noted above that in position 1 of the sequence switch the switches 641, 648 and 692 are locked in the home positions thereof, or, if they are not in the home positions at that time, are returned compulsorily to the home positions after the sequence switch has made a step to the position 2, so as to be certain, that the described consultation may start with the switches being in the home positions thereof. This will be explained first.

As soon as the sequence switch has stepped to its position 1, the start relay 1006 of the switch 641 is energized in a circuit:

35. Ground, E-brush of the sequence switch in position 1, relay 1006, battery.

Simultaneously the start relay 1012 of the switch 648 is energized in a circuit:

36. Ground, brush D in position 1, relay 1012, battery.

At the armature 1007 the relay 1006 prepares an energizing circuit for itself over the control wiper 647 of the stepping switch 641. An analogous circuit over the control wiper 654 of the stepping switch 648 is prepared for the relay 1012 at the contact 1013.

Moreover the circuits, in which the stepping magnets 1003 and 1009 of the switches 641 and 648, respectively, could be energized in a next position of the sequence switch, are now interrupted at contacts 1008 and 1014, respectively:

37. Ground, brush D in position 2, contact 1019, contact 1008, conductor 953, contact 940 of start relay 935, conductor 952, magnet coil 1003, battery; and 38. Ground, brush D in position 2, conductor 953, front contact 940 of start relay 935, conductor 952, front contact 1019, contact 1015, contact 1014, magnet coil 1009, battery.

Position 1 of the sequence switch is, however, not a resting position. After the magnetization of relay 738, the sequence switch steps to position 2 as previously explained. In this position the sequence switch waits for the homing of the stepping switches. In the event the switch 641 is now in the home position thereof, the energizing circuit for the relay 1006 is now completed at the E brush of the sequence switch in position 2:

39. Ground, brush E, left hand coil of relay 1018, contact 1 in the fifth level of switch 641, wiper 647 in home position, contact 1007, relay 1006, battery.

Simultaneously the above traced energizing circuit 35 is interrupted at the brush E. Apparently, in case the switch 641 is in the home position thereof, the relay 1006 remains energized, in series with the relay 1018.

At the same brush E of the sequence switch in position 2 a second energizing circuit for the relay 1012 is completed, if the switch 648 is in its home position:

40. Ground, brush E in position 2, relay 1017, first contact in the control level of switch 648, wiper 654, contact 1013, relay 1012, battery.

Apparently, in case the switch 648 is in the home position thereof, the relay 1012 remains energized in series with a relay 1017.

In the event, however, that one or both of the switches 641 and 648 are not in the desired start position, the circuits 39 and 40 are not closed, one or both of the relays 6006 and 6012 being de-energized, when the sequence switch steps from position 1 to position 2. Assuming that both switches 641 and 648 should be positioned, first the circuit 37 is completed at the back contact 1008, relay 1018 being inoperative. The stepping magnet 1003 of switch 641 is operated, makes the switch step to a next position, and closes at the front contact 1004 thereof a third circuit for the relay 1006, which operates in consequence thereof. The circuit 37 is now again interrupted at the back contact 1008, which results in the release of both the stepping magnet 1003 and the relay 1006, after which the stepping magnet is again energized, the switch 641 stepping to a third position. As in the position 2 of the sequence switch only the first contact in the control level is grounded, the cycle as described above will be repeated, until after reaching the home position a new energization of relay 1006 completes the circuit 39 for the energization in series of relays 1006 and 1018. Then the change-over contact 1019 completes the energizing circuit 38 of the stepping magnet 1009, after which the switch 648 hunts for the home position thereof in a way substantially similar to that described in connection with the switch 641. Finally relay 1012 is held in series with relay 1017.

The stepping magnet 692 is moved to the start position, if necessary, in a way analogous to that of the switches 641 and 648. This may be understood from a consideration of Figs. 11 and 12, showing the parts of switch 692. The start relay 1225 is energized in the position 1 of the sequence switch in the circuit:

41. Ground, brush F in position 1, relay 1225, battery.

A second energizing circuit for relay 1225 is prepared by its own contact 1227, while at the back contact 1226 thereof an energizing circuit for the stepping magnet 1222 is interrupted for the moment. Thereby the stepping of the switch 692, when in its start position, is prevented in the next position i. e. in position 2 of the sequence switch. In position 2 the sequence switch completes at the F-brush thereof the second energizing circuit for relay 1225:

42. Ground, brush F in position 2, right hand coil of relay 1204, conductor 1105, wiper 695, conductor 1110, contact 1227, relay 1225, battery.

This circuit 42 is only closed, in case the wipers of the switch 692 are positioned at the fourth contacts in their levels, from which position the consultation between calling station and register may really start.

If the switch is in any other position at this time, the cooperation between the relay 1225 and the stepping magnet 1222 will cause the right positioning of the switch 692 in a way substantially equal to that described in connection with the switches 641 and 648. Finally, the relay 1227 will be held in series with the relay 1204 in the circuit 42.

As now in position 2 of the sequence switch, after the switches 641, 648 and 692 have been made ready to start the operations thereof, the relays 1017, 1018 and 1204 are energized, the sequence switch steps successively to the positions 3 and 4 in a previously described manner. In position 3 the relays 1006 and 1018, 1012 and 1017, 1225 and 1204 are de-energized in consequence of the interruption of the circuits thereof, respectively, by brushes of the sequence switch in position 3.

VII. *The consultation of the calling station*

It has been pointed out that the start relay 1006 is released when the sequence switch proceeds to the position 3. It is, however, impossible in the position 3 to start the switch 641 since the energizing circuit of the stepping magnet 1003 is interrupted at the brush D of the sequence switch. However, the circuit 37 is again closed, when this switch steps to position 4, for the relay 935, which operates already in position 2 of the sequence switch, is held in position 4 in the circuit:

43. Ground, brush E in position 4, front contact 938, conductor 951, back contact 1001, conductor 948, left hand coil of relay 935, battery.

The switch 641 makes one step, and the relay 1006 operates, thereby breaking the circuit 37 again. At the second contact of the fifth contact level of the switch 641 a holding circuit for the relay 1006 in series with relay 1000 is completed as follows:

44. Ground, brush E in position 4, conductor 950, front contact 939, conductor 949, relay 1000, contact 2 of switch 641, wiper 647, front contact 1007, relay 1006, battery.

Relay 1006 locks at the contact 1008 thereof the switch 641 in the second position thereof, while relay 1000 prepares at the contact 1001 thereof the transmission of a signal by the relay transmitter shown in Fig. 9. The operation of this transmitter will be shortly explained hereinafter.

The grounding combination of the second set of contacts of the switch 641 is wiped by the relay transmitter and the telegraph signal "carriage return" is transmitted to the printer 301. About at the middle of the stop-impulse of this signal, the start-stop relay 935 is operated again and completes at the contact 940 the energizing circuit for the stepping magnet 1003 for a next step of the switch 641. The switch steps to the position 3 and stops there, owing to an energization of the relays 1000 and 1006 in a previously traced circuit. Relay 1000 starts at the contact 1001 thereof the relay transmitter for a second signal, which is the control signal: "line feed." Then the switch steps to position 4 to transmit the next signal: "carriage return." This goes on, until the wiper 647 encounters the contact 8 which is not connected to the relay 1000. In this position the series arrangement of the relays 1000 and 1006 is interrupted and the relay transmitter is prevented from starting whereas the circuit for a fresh energization of the stepping magnet 1003 is broken. The switch stops for the time being and waits for the reply from the calling station.

VIII. *Operation of relay transmitter and relay receiver*

In the position 2 the sequence switch starts the operation of the relay transmitter by preparatorily energizing the start stop relay 935 in a circuit:

45. Ground, brush C in position 2, relay 935, battery.

The energization is taken over in position 4 of the sequence switch by the previously traced circuit 43 which, however, is interrupted at a contact 1001, whenever the relay 1000 attracts the armature thereof. As relay 1000 operates in series with the relay 1006 in each position of the stepping switch 641, in which a signal should be transmitted, such a signal is announced by the de-energization of the start-stop relay 935. The contact 936 of said start-stop relay disconnects ground from the upper winding of the transmission relay 604 in the repeater in the following circuit:

46. Ground, brush E in position 4, front contact 936, conductor 729, resistance 727, upper coil of relay 604, battery.

As a result, the transmission relay 602 moves over the armature 603 thereof to — battery, and transmits thereby the start-impulse to the printer 301. Simultaneously the relay interrupter 900 is started by the energization of relay 905 in a circuit:

47. Ground, brush E in position 4, back contact 936, contact 902, lower coil of relay 905, battery.

Contact 906 of the relay 905 completes an energizing circuit for the second interruptor relay 901, which operates and interrupts at contact 902 the circuit 47, in which relay 905 had been energized. Now relay 905 releases and interrupts in its turn the circuit of relay 901, after which the circuit 47 is closed again at contact 902 and the described operations are repeated, the relays 905 and 901 operating and releasing successively rhythmically.

For the purpose of the relay transmitter the interruptor relays have to be designed so as to make the first relay 905 operate about 10 milliseconds after the change-over of the contact 936, and to make the second relay 901 attract the armature thereof exactly 20 milliseconds after the change-over of the contact 936. In order to comply with these requirements the relay interruptor is provided with an adjusting device, comprising the resistances 907, 908 and 909. Auxiliary windings of relays 905 and 901 are short-circuited by the arrangement of the adjustable resistances, the adjustment of which effects the required operating and release times of both relays 905 and 901. In Fig. 16 of the drawings is a time diagram of the operation of the relay transmitter showing in heavy lines the times during which the various relays of the transmitter operate the armatures thereof.

Assuming that the armatures of the interruptor relays require 2 milliseconds to be inverted and re-inverted, the magnetization time of relay 905 should e. g. be adjusted to 9 milliseconds, so as to close the circuit for the relay 901, 11 milliseconds after the release of the start relay 935. The releasing or breaking time of relay 905 should be adjusted to 9 milliseconds, so that the circuit for relay 901 is interrupted 9 milliseconds after that of relay 905. The magnetization time of relay 901 should be adjusted to 9 milliseconds and the time for disengaging the armature thereof to 11 milliseconds. Then the inversion of the contacts of the relay 901 is completed exactly 20 milliseconds after the repeater starts the transmission of the start impulse.

When the start-stop relay 935 releases, an energizing circuit is completed for the first counting relay 911, viz:

48. Ground, brush E in position 4, back contact 936, back contact 903, contacts 924 and 916, right hand coil of relay 911, battery.

Relay 911 holds itself in a circuit over the front contact 913 thereof:

49. Ground, brush E in position 4, contact 937, contacts 929 and 921, contact 913, left hand coil of relay 911, battery.

The relay 911 prepares the transmission of the first signal element by closing the contact 914 thereof. In case the wiper 642 of the stepping switch 641 is positioned on a grounded contact, ground is applied over the closed contact 914 to the upper winding of the polarized transmission relay 604 in the repeater, as soon as the interruptor relay 901 engages the armature thereof, i. e. after exactly 20 milliseconds, the circuit being as follows:

50. Ground, relevant contact of the first level of switch 641, wiper 642, conductor 943, front contact 914, back contacts 922 and 930, front contact 904, conductor 729, relay 604.

In consequence thereof the transmission relay 604 transmits a marking element. In case, however, no ground is applied to the circuit 50, the transmission relay 604 transmits a spacing element.

Upon the operation of relay 901 the energizing circuit for the second counting relay 915 is completed as follows:

51. Ground, brush E in position 4, back contact 936, front contact 903, front contact 912, right hand coil of relay 915, battery.

Relay 915, after operating, is held in an analogous circuit:

52. Ground, brush E in position 4, contact 937, back contacts 932 and 925, front contact 917, left hand coil of relay 915, battery.

When relay 901 releases the armature thereof after exactly 40 milliseconds, the circuit 50 is interrupted at the front contact 904, whereas an analogous circuit is completed at the back contact 904 for the transmission of the second signal element:

53. Ground, relevant contact in the second level of switch 641, wiper 643, conductor 944, front contact 918, back contacts 926 and 933, back contact 904, conductor 729, transmission relay 604, battery.

A marking element is transmitted, if the relevant contact of switch 641 is grounded; if this is not the case, the transmitted second impulse is a spacing element.

After the interruptor relay 901 releases the armature thereof for the first time, after 60 milliseconds, the third counting relay 919 is energized and held in a way substantially analogous to that described for the first two relays. The holding circuit 49 for the relay 911 is now broken at contact 921. The front contact 922 prepares a wiping circuit for the third signal element, which is only completed when the relay 901 attracts the armature thereof for the second time. Successively the two relays 923 and 927 are now energized and prepare similar wiping circuits, which may be easily traced now in connection with the above description. Under the control of the change-over contact 904 the fourth and fifth signal elements are successively transmitted in accordance with the grounding combination of the relevant set of contacts of one of the switches 641 and 648.

During the transmission of the last signal element the relay 931 is energized in a circuit:

54. Ground, brush E in position 4, back contact 936, front contact 903, front contact 928, relay 931, battery.

Relay 931 breaks at the armature 932 thereof the holding circuit for relay 923, and holds itself over the same in a circuit:

55. Ground, brush E in position 4, back contact 937, front contact 932, relay 931, battery.

Furthermore, relay 931 prepares at a front contact 933, thereof, the operation of the start-stop relay 935. When interruptor relay 901 releases for the third time, the circuit is completed as follows:

56. Ground, relay 935 right hand coil, front contact 933, back contact 904, conductor 729, upper winding of the transmission relay 604, battery.

The stop impulse is now transmitted, whereas a new operation of the relay interruptor is prevented by the interruption of the energizing circuit of relay 905 at contact 936 of relay 935. Relay 931 is restored owing to the interruption of its holding circuit 55. The transmission of a next signal may now follow.

It is remarked that relay transmitters and relay receivers of the kind referred to may be arranged in various ways for the purpose of the invention if only the transmission of signals in the described manner is made possible. For a more detailed disclosure of an improved relay arrangement such as the one described reference is made to the co-pending U. S. application Serial No. 772,407, filed September 5, 1947, now U. S. Patent 2,546,369 dated March 27, 1951, for Start-Stop Repeater.

Considering now the operation of the relay receiver, shown in Fig. 8, it is noted that signals from the station 301 are received at the relay 602 of the repeater, the tongue 603 of which is for the time of the consulation connected over a back contact 690 and a conductor 730 to a back contact 838 of the receiver relay 837. In the idle condition of the receiver the relays 837 and 841 are energized in series in a circuit:

57. Positive battery, armature 603 of reception relay 602, contacts 701 and 741, conductor 606, back contact 690, conductor 730, front contact 838, left hand coils of relays 841 and 837, battery.

The relay 837 is a quickly operating relay, whereas the relay 841 is of the slow-releasing type and adapted to be adjusted to releasing times of a sufficient duration. In order to enable the impulse selecting relay 845 to select the first current element of the signal just at the middle thereof in a manner described hereinafter, an auxiliary winding of the relay 841 is closed over an adjustable resistance 843, by means of which the release time can be adjusted from 8 to 35 milliseconds.

When the relay 602 moves over the armature 603 thereof on the start impulse of a signal the circuit 57 is disconnected from positive battery and relay 837 re-inverts the armatures thereof quickly, thereby connecting the armature 603 to the conductor 844 over a current limiting resistance 840.

In idle condition of the receiver, a relay 855 being somewhat slow to release is held in operative condition in a circuit:

58. Ground, front contact 839, relay 855, battery.

In this condition energizing paths are prepared at contacts 856–860, inclusive, for the set of five impulse wiping relays 845, 847, 849, 851 and 853. Upon the reception of a start impulse, these circuits are completed, since the relay 855 has not yet released the armatures thereof, whereas armature 839 of the quickly releasing relay 837 is already re-inverted.

The circuit for relay 845, for example, is:

59. Ground, back contact 839, front contact 856, right hand winding of relay 845, battery.

The quickly operating impulse wiping relays attract the armatures thereof, thereby closing holding circuits for themselves, such as for the relay 845:

60. Ground, brush C of the sequence switch in position 4, back contact 804, back contact 818, contact 846, holding coil of relay 845, battery.

The relays 847, 849, 851 and 853 hold themselves over back contacts of one of the counting relays 813, 819, 825 and 831, that is to say of the counting relays preceding in the sequence. So, for example, relay 847 is held in the circuit:

61. Ground, brush C in position 4, back contact 817 of the counting relay 813, contact 848, holding coil of relay 847, battery.

As soon as the relay 841 releases the armature thereof, the relay interruptor 800 is started by the energization of relay 801 in a circuit:

62. Ground, brush C in position 4, back contact 842, conductor 812, contact 807, operating coil of relay 801, battery.

In a similar circuit the relay 806 is energized after relay 801 has attracted the armature thereof. By the operation of relay 806, however, the circuit 62 is again interrupted, in consequence of which relay 801 releases again. The arrangement and operation of the relay interruptor 800 is substantially similar to those of the interruptor 900 previously described. The cycle of operation may be repeated, until the relay 841 breaks the circuit 62 at the beginning of the stop impulse of the received signal. Fig. 17 of the drawings is a time diagram of the operation of the relay receiver, showing in heavy lines the operation time of the interruptor relays 801 and 806, the counting relays and the start-stop relay 841.

When the relay 801 attracts the armatures thereof, for the first time, an energizing circuit is completed for the right hand coil of the first counting relay 813:

63. Ground, front contact 803, contacts 832 and 820, relay 813, battery.

Relay 813 holds during the whole cycle in the circuit:

64. Ground, brush C in position 4, contact 842, conductor 812, contact 815, holding coil of relay 813, battery.

When the relay 801 releases the armatures thereof for the first time, an energizing circuit for the second counting relay 819 is completed:

65. Ground, back contact 803, contact 826, front contact 814, relay 819, battery.

The second counting relay 819 holds also for the whole cycle in a circuit, which is partly identical with circuit 65, the holding coils of the relays 813 and 819 being arranged in parallel between the conductor 812 and negative battery. In an analogous manner the relay 819 at the front contact 820 thereof prepares an energizing circuit for the next relay 825, which circuit is completed, when interruptor relay 801 attracts the armatures thereof for the second time. Relay 825 does the same with respect to the fourth counting relay 831, which is energized after relay 801 releases the armatures thereof for the second time, whereas at last the relay 837 is energized at the moment relay 801 has attracted the armatures thereof for the third and last time in this cycle. The circuit for relay 837 is:

66. Ground, front contact 803, front contact 832, operating coil of relay 837, battery.

In circuits arranged in parallel to circuit 65, the relays 825 and 831 are held until armature 842 is attracted by relay 841 which is energized in series with the holding coil of relay 837 in a circuit 57 previously traced.

During the operation of the relay receiver the holding coils of the selecting relays 845, 847, 849, 851 and 853 are successively disconnected from ground in the middle of the relevant signal element for about 2 milliseconds, and are connected to the telegraph battery over the armature 603 of the reception relay 602. If the armature is against positive battery (marking) the relevant selecting relay remains operative.

If, however, the armature 603 is moved over to the negative battery (space) the relevant selecting relay releases. The selecting relays 845, 847, 849, 851 and 853 should be of a very rapidly operating type, having e. g. a release time of 1 millisecond. Evidently, after all elements of the signals have been wiped, the selecting relays show the permutation of spacing and marking impulses of the received signal in the permutation of operative and nonoperative relays. Fig. 12 of the drawings shows the arrangement of the contacts controlled by the selecting relays.

Ground is applied to the holding coils of the selecting relays over the armature 804 of the interruptor relay 801 in operative and inoperative condition of this relay. Only during the time of inversion, when armature 804 moves over from the back contact to the front contact thereof, or vice versa e. g. for 2 milliseconds, the holding coils of the selecting relays are disconnected from ground. The release time of the relay 841 should be adjusted to such a duration, that the relay 801 inverts the armatures thereof for the first time exactly in the middle of the first code element.

Then the holding coil of relay 845 is disconnected from ground for 2 milliseconds and is connected to the telegraph battery in a circuit:

67. Telegraph battery, tongue 603, contacts 701, 741 and 690, conductor 730, back contact 838, resistance 840, back contact 818, front contact 846, relay 845, negative battery.

If the first code element is a mark, telegraph battery is positive and relay 845 holds. Some milliseconds afterwards, at the energization of the relay 813 the holding circuit is switched over to another circuit at the make-before-break contact 818, so that a following reinversion of the armature 804 cannot disconnect the holding coil of relay 845 from ground.

If, however, the first code element is a space, the relay 845 interrupts its own circuit within 2 milliseconds and releases.

Simultaneously with the disconnection of relay 845 from the conductor 844, the relay 847 is connected thereto at the contact 816 of the first counting relay. Moreover, contact 817 interrupts the holding circuit 61 thereafter, so that the arrangement is prepared for the wiping of the second code element, which occurs, when relay 801 releases the armatures thereof for the first time. Then ground is disconnected for 2 milliseconds from the circuit:

68. Armature 804, front contact 816, back contact 824, contact 848, holding coil of relay 847, battery.

It is remarked that contact 816 should close, before contact 817 is broken.

Relay 847 holds itself on positive battery over the conductor 730 or releases in accordance with the current character of the second code element. Then the second counting relay 819 is energized as previously explained and in a way substantially analogous to that described hereinabove, prepares the wiping of the third element by the relay 849. It will be easily possible now to follow the wiping operations with respect to the last three code elements of the signals and to trace the circuits necessary thereto, taking into regard the above description. Assuming finally, that the last code element is a mark element the relay 845 will be held in a circuit over the armature 804:

69. Ground, brush C in position 4, armature 804, front contacts 816, 822, 828 and 834, contact 854, relay 853, battery.

The relay 801 now attracts the armatures thereof for the third and last time in this cycle closing thereby the operating circuit 66 for the relay 837. Relay 837 attracts and completes a previously traced holding circuit for itself, in which circuit also relay 841 is energized as soon as the tongue 603 of the reception relay is laid against positive battery owing to the marking character of the fifth code element or else owing to the start of the stop impulse. Anyhow, the relay 841 should attract the armature thereof before the interruptor relay 801 releases for the third time. Then the holding circuits for the counting relays 813, 819, 825 and 831 are preparatorily cut off at the contact 842 and are finally broken when the armature 802 of the relay 801 removes ground from the conductor 812 at the third release in the cycle. In consequence thereof the counting relays release. Meanwhile, however, when relay 837 was operated, the code permutation stored in the selecting relays 845, 847, 849, 851 and 853 was used for the energization of one of the relays 631 and 632 shown in Fig. 12, in accordance with the received signal, the circuit for one of these relays being completed at a contact 1207 of the relay 837. The selecting relays may now be restored to normal by the interruption of their holding circuits at contacts of the counting relays. In the meantime the auxiliary relay 855 is energized again at the front contact 839 and closes the contacts 856–860, inclusive thereof. The relay receiver waits now with energized relays 837, 841 and 855 for a next signal to be received.

It should be noted that in the position 8 of the switch 641 the relay 1027 is operated in series with the control relay 1006 in a circuit (Fig. 10):

70. Ground, brush G of the sequence switch in position 4, back contacts 1031 and 1030 of the relays 631 and 632, respectively, relay 1027, contact 8 of the control level of switch 641, wiper 647, contact 1007, relay 1006, battery.

The switch 641 is now prevented from stepping since the magnet 1003 cannot be energized when relay 1006 is operated.

Meanwhile the relay 631 is energized upon the reception of the caller's reply to the first injury, in case this reply was affirmative. The relays 845 and 853 are now energized according to the code signal "+" (X000X). The circuit is (Fig. 12):

71. Ground, brush C in position 4, front contact 1208 of the relay 1027, contact 1207 of the relay 837 of the relay receiver, contacts 1210, 1212, 1213, 1211, contact 1214, relay 631, battery.

Simultaneously the registering relay 6003 is energized in the circuit:

72. Ground, brush C in position 4, front contact 1208, contact 1207, a path over contacts of the selecting-relays as traced in circuit 71, back contact 689, conductor 1109, wiper 697 of the stepping switch 692 in position 4, conductor 1101, relay 6003, battery.

The relay 6003 holds the relays 631 and itself in circuits, respectively:

73. Ground, brush F in position 4, contact 6005, conductor 1101, wiper 697, conductor 1109, back contact 689, relay 631, battery; and 74. Ground, brush F in position 4, relay 6003, battery.

Relay 632 is energized, in the event that the reply was negative, the signal being now "—" (XX000). The relays 845 and 847 are now operated. The circuit is:

75. Ground, brush C in position 4, front contact 1208, contact 1207, contacts 1210, 1212, 1213, front contact 1211, contact 1215, relay 632, battery.

The relay 6003 is not energized in this case.

In any case at one of the contacts 1030 and 1031 of the receiving relays 632 and 631, respectively, the series arrangement of the relays 1006 and 1027 is interrupted so that the same are deenergized. The circuit for stepping magnet 1003 is closed and switch 641 steps to position 9, in which the relay 1006 is energized in series with the relay 1000 for the transmission of a next series of signals concerning the second inquiry. Further the release of relay 1027 effects at the back contact 1208 thereof the energization of the stepping magnet 1222 of switch 692, the circuit being:

76. Ground, brush C in position 4, back contact 1208, one of the contacts 1216 and 1218 arranged in parallel, magnet coil 1222, battery.

The switch 692 makes a step, in consequence of which the holding circuit 73 for the relay 631 is interrupted. A holding circuit for the relay 632, if energized, is interrupted at a contact 1223 of the stepping magnet 1222:

77. Ground, contact 1223, contact 1217, relay 632, battery.

The switch 641, as already pointed out, steps on in a way previously explained until the wiper 647 thereof is positioned on the contact 13 in the control level of the switch, while transmitting the signals: "comma," "space," "interrogation point," "space," to the station 301. Now the switch waits for the caller's reply to the second inquiry.

The relay receiver positions the contacts 1210—1215 of the selecting relays according to either the signal "+" or the signal "—," while after the finishing of the signal one of the relays 631 and 632 and, if necessary, the second registering relay 6006 are energized and hold in circuits, substantially similar to those traced for the registering of the caller's reply to the first question. In any case, the series arrangement of the relays 1006 and 1027 over the wiper 647 in position 13 is broken at one of the contacts 1030 and 1031 in consequence of which the switch steps to the following position 14. In this position a punctuation mark is transmitted as a sign, that the introductory part of the consulation is closed and that, in case the second registering relay 6006 is not energized, the inquiry about the particular staations of the special group will start now.

The contact 14 in the control level is connected to relay 1000, so that the switch steps on to the position 15 when the relay transmitter is restored. The relay 1006 is held in this position in series with the relay 1018 in a circuit:

78. Ground, brush G in position 4, contact 1034, right hand coil of relay 1018, contact 15, wiper 647, contact 1007, relay 1006, battery.

The switch 641 is prevented from stepping, owing to the interruption of the energizing circuit of the stepping magnet 1003, at the armature 1019, whereas the front contact of the armature prepares the operation of the second stepping switch 648. The switch 641 remains in position 15 until the contact 1034 of relay 1033 interrupts the circuit 78.

Assuming now, that the second registering relay 6006 has not been operated, the stepping magnet 1009 of the switch 648 is now energized in the circuit:

79. Ground, brush D in position 4, conductor 953, contact 940, conductor 952, front contact 1019, contact 1015 of the second registering relay 6006, contact 1014, stepping magnet 1009, battery.

The switch 648 steps from its home position to the first operating position, while the control relay 1012 is energized in a circuit over an auxiliary closing contact 1010 of the stepping magnet 1009 of switch 648:

80. Ground, contact 1010, relay 1012, battery.

Every time the relay 1012 is operated in the circuit 80, the same prepares a holding circuit at its own contact 1013, which is completed whenever the wiper 654 finds ground on the associate contact in the control level. Ground is, however, not yet applied to the second contact in this level, since the closing contacts 1035, 1036 and 1037 are not closed at this moment, and the contact 1038 of the sequence switch applies only ground over the brush H in positions 6, 7 and 8, which have not yet been reached. The contact 1035 is an auxiliary contact of the stepping magnet 1222 of the switch 692; contact 1036 is controlled by the second registering relay 6006, which is assumed to be inoperative, whereas the contact 1037 is closed by the relay 1228 only at the end of the consultation. Consequently relay 1012 releases, after the magnet 1009 is de-energized, whereupon the switch 648 steps on to the position 3. The contacts 3-6 inclusive in the control level of the switch are connected over contact 1023 of the relay 1022 to the relay 1000, so as to enable the switch 648 to transmit in a manner previously explained the signals: "carriage return," "line feed," "carriage return," "figures shift" in the positions 3-6 successively, and to step on to the position 7. The control contact associated with the wiper 654 in position 7, as well as the control contacts 8, 9, 11 and 12 are connected to the relay 1000, without interference of the contact 1023. In consequence thereof the relay transmitter in the positions 7, 8 and 9 wipes successively the grounding combination of the three relevant sets of contacts in exactly the same manner as explained heretofore.

The switch 648 is only stopped in the position 10, for the reason that in this position the relay 1012 is no longer energized in series with the relay 1000 in the circuit:

81. Ground, brush E in position 4, conductor 950, contact 939 of the start-stop relay 935 in the relay transmitter, conductor 949, relay 1000, contact 1023, wiper 654 of the stepping switch 648, contact 1013, relay 1012, battery.

However, relay 1012 is energized in series with the relay 1027 in the circuit:

82. Ground, brush G in position 4, contacts 1031 and 1030, relay 1027, back contact 1040, contact 10, brush 654, contact 1013, relay 1012, battery.

This circuit can only be broken at either one of the contacts 1030 or 1031 of the receiving relays 632 and 631, respectively, which occurs upon the reception of the caller's reply to the transmission of the first station's number. In the position 10 of the switch 648 the relay 1022 is operated owing to the closure of the contact 1028 of the relay 1027, in a circuit:

83. Ground, brush G in position 4, contact 1028, contact 1020 of the relay 1018 (which is still operated), relay 1022, battery.

After the relay 1027 is de-energized in conseqence of the reception of the caller's reply, relay 1022 holds in a circuit:

84. Ground, brush G in position 4, contact 1047 of relay 1046, contact 1026, contact 1020, relay 1022, battery.

The relay 1046 is operated at this moment, as will be explained hereinafter. The contact 1023 of relay 1022 disconnects ground from the contacts 3-6 inclusive, in order to prevent during the next nine cycles of the stepping switch 648 the transmission of the four signals stored in the sets of contacts 3-6, respectively. Immediately upon reaching the position 10 for the tenth time, the relay 1046 breaks at the contact 1047 thereof the holding circuit 84 for the relay 1022, so that the transmission of the signals stored in the positions 3-6, inclusive, is now repeated in order to start the inquiry after the next ten stations on a new line. It is observed, that ten successive station numbers each having two digits and being followed by "space," "reply signal," "comma," "space," can be printed on one line by means of the known printer apparatus, In the positions 7 and 8 of the switch 648 figure signals are transmitted in the meantime by means of the sets of contacts in the position 3 of the numbering switches 655 and 662. The contacts in the position 7 are grounded in code permutations corresponding to the tens-signals over conductors 674–678, inclusive, and the wipers 656–660, inclusive, of the switch 655, whereas the contacts in the position 8 are grounded in the code permutations corresponding to the units-signals over the conductors 679–683, inclusive, and the wipers 663–667, inclusive, of the switch 662.

It will now be explained, in what manner the numbering switches 655 and 662 are moved back to the position, in which the consultation concerning the various stations can start, if they are not in that position. Their positioning is not effected simultaneously with that of the switches 641, 648 and 692, viz., in the position 2 of the sequence switch. This is not necessary, since the operations of the latter switches in connection with the transmission of the first two interrogative signals and the reception of the reply thereto, affords a sufficient time for synchronizing the numbering switches only after the sequence switch has taken the position 4 thereof. Then two stepping magnets 1044 and 1053 are energized, respectively, in circuits:

85. Ground, brush G in position 4, contact 1049, magnet coil 1044, battery; and

86. Ground, brush G in position 4, contact 1056, magnet coil 1053, battery.

Stepping magnet 1044 prepares at the contact 1045 thereof the energizing circuit for the relay 1046 as follows:

87. Ground, contact 1025 of the relay 1022 not yet energized, contact 1045, relay 1046, battery. The auxiliary contact 1054 of magnet 1053 energizes the control relay 1055:

88. Ground, contact 1054, relay 1055, battery.

The switches 655 and 662 step on. In the event the control wipers 661 and 668 find grounded contacts in the control level of the associated switches, the relay 1046 becomes and relay 1055 remains energized in the new position, thereby interrupting the energizing circuits of the stepping magnets 1044 and 1053, respectively. However, if no ground is applied to the contacts in the control levels associated with the wipers, the relays 1046 and 1055 release the armatures thereof and the switches 655 and 662 make another step. The control switch 692 is already positioned in the position 4 thereof, as previously described. It may now be easily observed that ground is only applied to the first two contacts in the control levels of the switches 655 and 662, viz. over the circuit:

89. Upper wire of the group of conductors 1112, contact 4 in level 1 of the control switch 692, wiper 693, brush G in position 4, ground.

In consequence thereof the above described cooperation between magnets and control relays is repeated, until the switches have been restored to the home position. They step to the next position, when the control switch 692 steps to the position 5, after the reception of the first reply, for during the movement of the switch from the position 4 to the position 5, ground is disconnected for a moment from the circuit 89. In consequence thereof the relays 1046 and 1055 release the armatures thereof and are only energized again, after the switches 655 and 662 have stepped. When switch 692 steps to the position 6 after the reception of the second reply, this operation is repeated, whereafter the control switch 692 and the numbering switches 655 and 662 are synchronized in order to start the consultation concerning the stations wanted in the connection. In this condition the switches wait for the caller's answer to the question "Do you want the station 10 to be connected to your arrangement?", after the tens figure 1 stored in the position 3 of switch 655 has been transmitted in position 7 of the switch 648, and the units figure 0, stored in the position 3 of switch 662 has been transmitted in position 8 of the switch 648. When the reply has effected the energization of either the relay 631 or the relay 632, the circuit 82 for the relays 1012 and 1027 is broken at contacts 1030 or 1031. Switch 648 steps to the position 11 in which a "comma" is transmitted, and then to the position 12, a "space" now being transmitted. Then the switch starts a new cycle, stepping to the home position, in which relay 1012 cannot hold itself in series with 1017, since the contact 1021 of the sequence switch is only closed in positions 2 and 10 of the same. Then the switch steps to the positions 2, 3, 4, 5, 6 and 7 since only in the position 7 ground is applied to the relevant contact in the control level, the relay 1012 now being held in a series arrangement with relay 1000. The transmission of the number 1 is now effected, since in the meantime the control switch 692 and the units switch 662 have stepped to the position of the next station 11.

Before this occurs, however, the registering relay associated with the station 11 is energized in a circuit which is substantially similar to that for the registering relay 6008, which is assumed to be associated with the station 37. This circuit is, however, only closed, in case of energization of the affirmative relay 631, in reply to the first number 10. The analogous circuit for the relay 6008 is:

90. Ground, brush C in position 4, front contact 1208, contacts 1207, 1210, 1212, 1213, back contact 1211, contact 1214, back contact 689, conductor 1109, wiper 697, the contact in the level 5 of the contact bank of switch 692 associated with the station 37, conductor 1103, relay 6008, battery.

The relay 6008 when energized, closes a holding circuit for itself:

91. Ground, brush C in position 4, contact 6011, relay 6008, battery.

As previously explained the switch 648 is stopped in position 10 thereof whereas relay 1027 is energized. Thus armature 1208 prepares the circuit for one of the relays 631 and 632. After the reply is received relay 1027 releases the armatures thereof and ground is switched over to stepping magnet 1222 over one of the contacts 1216 and 1217. In consequence thereof the switch 692 steps to the next position.

The wiper 693 interrupts the circuit in which the relay 1055 is energized, owing to which the stepping magnet 1053 operates. The units switch 662 makes a step to the position indicating the figure 1. The switch 655 does not step, since the contacts in the level 2 of the control switch associated with the stations 10–19 are connected to one and the same contact 3 in the control level of the switch 655.

It will be easily understood that the switch 692 cooperating with the switch 648 and the numbering switches 655 and 662, controls the inquiry about the stations 12–49 in a manner, substantially similar to the inquiry about the stations 10 and 11.

Figure 2:
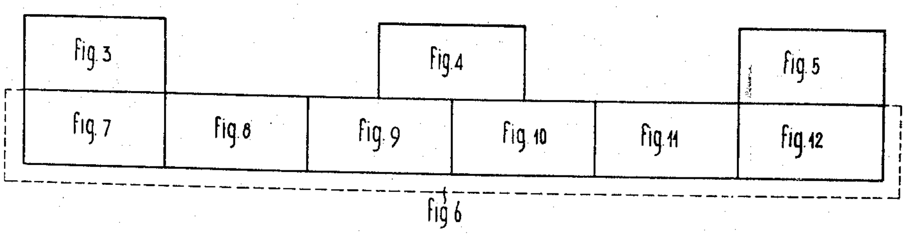
Fig. 2 shows the mode of combining Figs. 3 to 12, inclusive, to form a unified telegraph system according to the invention.

It is, however, pointed out, that after the inquiry about the station 19 not only ground is disconnected from the holding circuit of relay 1055, but also from the holding circuit of relay 1046, owing to which the tens switch 655 steps to the position the contacts of which in their grounding combination indicate the figure 2.

When finally an inquiry has been made about the last station 49 the switch 692 steps to the last but one position, whereupon the relay 1228 is energized as a sign that the consultation is finished in the circuit:

92. Ground, brush F in position 4, relay 1228, conductor 1107, relevant contact in the level 3, wiper 695, conductor 1110, contact 1227, relay 1225, battery.

Switch 692 stops for the time being in this position. Meanwhile the switch 648 has made its last cycle and is stopped in the position 2, for in this position the relevant contact in the control level is connected to ground as follows:

93. Second contact in control level of switch 648, relay 1033, front contact 1037 of the relay 1228, brush F in position 4, ground.

As a result the control relay 1012 is now held in series with the relay 1033 and the switch 648 cannot stop for the time being, whereas the contact 1034 of relay 1033 breaks the circuit in which the relays 1018 and 1006 are energized, so as to lock the switch 641 in the position 15 thereof. It should be mentioned that the "comma," which is transmitted by the switch 648 in position 11, is changed after the last inquiry to a period to inform the calling station that the consultation is closed. This is performed by connecting ground to the last permutation contact over a conductor 1057 and the contact 1058 of the relay 1228, which is now energized as explained hereinbefore.

The permutation corresponding to the signal "." is 00XXX, whereas the one corresponding to "," is 00XX0.

A full description has been given before in connection with Figs. 5 and 6 of the switching-in of the called stations in accordance with the caller's commands, the relays 6003, 6006 and the various relays like 6008, individual to the stations being energized.

In the above description of the switching-in of the called stations it has been pointed out that the latter are only switched in, when the sequence switch has stepped on to the position 6 thereof. The sequence switch should reach this position before the preliminary signals are transmitted by the switch 641, as explained hereinafter. To accomplish this, the relay 1033, which is energized in position 2 of switch 648 after the last cycle of the latter, is provided with a front contact 755, shown in Fig. 7, which connects ground to the contact 4 of the A-level of the sequence switch.

In consequence thereof the relay 747 operates and closes the circuit for the stepping magnet 750. The sequence switch steps to position 5, closing thereby some circuits shown in Fig. 5, and then to position 6, since the contact 5 is also grounded. The relay 1033 prepares at the contact 608 thereof shown in Fig. 6 the transmission of the announcement of the broadcast message by connecting the reception loops of the calling and called stations to the tongue of the register transmission relay 604. The switch 641 transmits the announcement and the necessary control signals for the printers in the positions 16–38 successively, the announcement e. g. being the word: "broadcast-message." Then the switch steps to the position 39, in which position the relay 688 is energized in series with the control relay 1006. The switch remains in this position for the time being, while the relay 688 holds itself over a second winding thereof and a contact 1042 of the sequence switch. Simultaneously the contact 10 in the control level of switch 648 is disconnected at contact 1040 from the relay 1027 and connected to the relay 1000, so as to prepare the transmission of reporting-back signals in position 10 of the switch 648.

The back contact 691 of relay 688 cuts off the armature 605 of the transmission relay 604 from the parallel arrangement of the transmission relays 506 of the called stations and connects by means of front contact 690 the armature of the receiving relay 602 to said parallel arrangement of transmission relays. The register is now so arranged that the message may follow.

To indicate the end of the latter, the calling party presses shortly his release key, as a result of which the relay 733 is de-energized. Relay 733 now at its back contacts applies ground to the contact 6 in the control level A of the sequence switch 753, so that the latter steps to position 7. In this position the switch 692 is moved back to the home position in order to prepare the report of good reception from the called stations to the calling station. In position 7 (Fig. 12) a circuit is closed for the stepping magnet 1222 of the switch 692:

94. Ground, brush F in position 7, contact 1226, magnet coil 1222, battery.

Thus the stepping of the switch 692 is started, the relay 1225 and the magnet 1222 cooperating in a manner explained hereinbefore. The numbering switches are also restarted in position 7 of the sequence switch and will recommence in this position the stepping movements synchronized to those of switch 692. In position 5 of the switch 692 the relay 1204 (Fig. 12) operates in a circuit:

95. Ground, brush F in position 7, relay 1204, conductor 1106, contact 5 in level 3 of switch 692, wiper 695, conductor 1110, contact 1227, relay 1225, battery.

Ground is now applied to the contact 7 in level A of the sequence switch at a contact 762 of relay 1204; the sequence switch steps on to the position 8, and waits there until the relay 1231 is energized as a sign that the reporting-back is finished.

Meanwhile in position 7 of the sequence switch the series arrangement of right hand coils of relay 688, and relay 1006 is interrupted owing to which the switch 641 steps to the next position. Now the relay 1018 is again energized, and prepares by means of the front contact 1020 thereof the second cooperation of switch 648 and the relay transmitter. This cooperation starts only when the sequence switch reaches position 8 after the switch 692 and the numbering switches 655 and 662 have been repositioned. Now the successive numbers are transmitted in a way, substantially similar to that described in connection with the preceding inquiry. However, in the position 10 of the switch 648 in its cycle, the relay 1027 is not energized in series with relay 1012, owing to the interruption of the circuit at armature 1040, so that the switch 648 steps on immediately, after having transmitted in this position the reporting-back signal, in accordance with the condition of the reporting-back relays 698 and 6000 in a manner fully explained hereinbefore. The switch 692 should step to the next position after every rotation of switch 648, for the reporting-back of the next station. The cooperation of switches 648 and 692 is accomplished by means of the relay 1033. This relay was already energized at the end of the inquiry and stopped thereby switch 648 in its position 2, as previously described. In positions 6–8, inclusive, a holding circuit is established over the sequence switch contact 1038. This holding circuit is, however, interrupted at contact 1035 of the stepping magnet 1222, in case the latter is energized.

At each rotation, when reaching position 2, the switch 648 energizes the relay 1033, and is consequently stopped. Relay 1033 closes at contact 1230 a circuit for the stepping switch 1222:

96. Ground, brush F in position 8, contact 1230, contact 1232, magnet coil 1222, battery.

The switch 692 steps to the next position and magnet 1222 interrupts the holding circuit for the relay 1033 again.

The reporting back is finished by the energization of relay 1231, which, at the contact 1232 thereof, prevents the switch 692 from further stepping. The stepping switch 648 steps on now, until relay 1033 attracts the armature thereof again. The series arrangement of the contact 759 of the relay 1231 and of contact 755 of relay 1033, connected to the contact 8 in the A-level of the sequence switch, makes the sequence switch step on to the position 10.

In this position the switches 641, 648 and 692 are brought back to their home position, and fixed therein in a manner described previously. The series arrangement of contacts 758, 761 and 762 is connected to the contact 10 in the level A of the sequence switch. After the homing of the switches 641, 648 and 692, the three relays 1018, 1017 and 1204 are energized, so that the sequence switch steps on via position 11 to the home position 0. In this position the broadcast register is prepared for a new call.

It will be understood that each of the elements described above, or two or more together, may also find a useful application in the other types of telegraph systems differing from the types described above.

While the invention has been illustrated and described as embodied in automatic switching means for telegraph systems, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A telegraph system, comprising in combination, a calling station and a central station, said calling and central stations having telegraph transmitter and receiver equipment arranged therein; a group of stations called by said calling station for receiving a broadcast message transmitted by said calling station; a broadcast register located in said central station for connecting said calling station to at least part of said group of stations called by said calling station for receiving the broadcast message; a finder switch forming part of the register and having a contact bank and a wiper engaging the same; a switch-over relay connected to a contact of said bank so as to be energized when said contact of said bank of said finder switch engages said wiper, said switch-over relay connecting upon energization thereof said finder switch to said calling station; receiver means located in said broadcast register for receiving signals transmitted by said calling station; a first receiving relay; a second receiving relay; means for energizing said first receiving relay over said receiver means when a first predetermined signal transmitted by said calling station is received by said receiver means; means for energizing said second receiving relay over said receiver means when a second predetermined signal transmitted by said calling station is received by said receiver means; a register switch common to said group of stations and actuated by the energization of said receiving relays; and means connected to said register switch for automatically calling any station of said group of stations for receiving the broadcast message transmitted by said calling station.

2. A telegraph system, comprising in combination, a calling station and a central station said calling and central stations having telegraph transmitter and receiver apparatus arranged therein; a group of stations called by said calling station for receiving a broadcast message transmitted by said calling station; a broadcast register located in said central station for connecting said calling station to at least part of said group of stations called by said calling station for receiving the broadcast message; a finder switch forming part of the register and having a contact bank and a wiper engaging the same; a first switch-over relay connected to a contact of said bank so as to be energized when said contact of said bank of said finder switch engages said wiper, said first switch-over relay connecting upon energization thereof said finder switch to said calling station; receiver means located in said broadcast register for receiving signals transmitted by said calling station; a first receiving relay; a second receiving relay; means for energizing said first receiving relay over said receiver means when a first predetermined signal transmitted by said calling station is received by said receiver means; means for energizing said second receiving relay over said receiver means when a second predetermined signal transmitted by said calling station is received by said receiving means; a register switch common to said group of stations and actuated by the energization of said receiving relays; a plurality of registering relays connected to said register switch, said registering relays being associated, respectively, with said called stations; second switch-over relays being energized, respectively, upon energization of said registering relays; and means connected to said second switch-over relays for automatically calling, respectively, said stations of said group of stations for receiving the broadcast message transmitted by said calling station.

3. A telegraph system, comprising in combination, a group of stations and a central station; telegraph transmitter and receiver apparatus arranged in each of said stations forming said group of stations; a broadcast register located in said central station for connecting a calling station to at least part of said group of stations called by said calling station for receiving the broadcast message; a finder switch forming part of the register and having a contact bank and a wiper engaging the same; a switch-over relay connected to a contact of said bank so as to be energized when said contact of said bank of said finder switch engages said wiper, said switch-over relay connecting upon energization thereof said finder switch to said calling station; receiver means forming part of said broadcast register and receiving signals transmitted by said calling station; a first receiving relay; a second receiving relay; means for energizing said first receiving relay over said receiver means when a first predetermined signal transmitted by said calling station is received by said receiver means; means for energizing said second receiving relay over said receiver means when a second predetermined signal transmitted by said calling station is received by said receiver means; a register switch common to said group of stations and actuated by the energization of said receiving relays; and means connected to said register switch for automatically calling any station of said group of stations for receiving the broadcast message transmitted by said calling station.

4. A telegraph system, comprising in combination, a group of stations and a central station; a combined receiving and transmitting printer arranged in each of said stations; a broadcast register located in said central station for connecting a calling station to at least part of said group of stations called by said calling station for receiving the broadcast message; a finder switch forming part of the register and having a contact bank and a wiper engaging the same; a first switch-over relay connected to a contact of said bank so as to be energized when said contact of said bank of said finder switch engages said wiper, said first switch-over relay connecting upon energization thereof said finder switch to said calling station; receiver means forming part of said broadcast register and receiving signals transmitted by said calling station; a first receiving relay; a second receiving relay; means for energizing said first receiving relay over said receiver means when a first predetermined signal transmitted by said calling station is received by said receiver means; means for energizing said second receiving relay over said receiver means when a second predetermined signal transmitted by said calling station is received by said receiver means; a register switch actuated by the energization of said receiving relays; a plurality of registering relays connected to said register switch, said registering relays being associated, respectively, with individual stations forming said group of stations; second switch-over relays being energized, respectively, upon energization of said registering relays; and means connected to said second switch-over relays for automatically calling, respectively, said stations of said group of stations for receiving by said printers thereof the broadcast message transmitted by said printer of said calling station.

5. A telegraph system, comprising in combination, a calling station; a plurality of stations called by said calling station for receiving a broadcast message transmitted by said calling station; a register for connecting said calling station to at least part of said plurality of stations called by said calling station for receiving the broadcast message; a finder switch forming part of register and having a contact bank and a grounded wiper engaging the same; a switch-over relay connected to a contact of said bank so as to be energized when said contact of said bank of said finder switch engages said grounded wiper, said switch-over relay connecting upon energization thereof said finder switch to said calling station; a receiving arrangement forming part of said register and receiving signals transmitted by said calling station; a first receiving relay; a second receiving relay; means for energizing said first receiving relay over said receiving arrangement when a first predetermined signal transmitted by said calling station is received by said receiving arrangement; means for energizing said second receiving relay over said receiving arrangement when a second predetermined signal transmitted by said calling station is received by said receiving arrangement; a register switch actuated by the energization of said receiving relays; means connected to said register switch for automatically calling any station of said plurality of stations for receiving the broadcast message transmitted by said calling station; a plurality of back-report relays connected, respectively, to said stations; means for energizing said back-report relays, respectively, by said stations temporarily at the end of a broadcast message transmitted by said calling station; and means controlled, respectively, by said back-report relays for indicating at said calling station a good reception by said stations connected to said back-report relays, respectively, of the broadcast message transmitted by said calling station.

6. A telegraph system, comprising in combination, a calling station; a plurality of stations called by said calling station for receiving a broadcast message transmitted by said calling station; a register for connecting said calling station to at least part of said plurality of stations called by said calling station for receiving the broadcast message; a finder switch forming part of the register and having a contact bank and a grounded wiper engaging the same; a first switch-over relay connected to a contact of said bank so as to be energized when said contact of said bank of said finder switch engages said grounded wiper, said first switch over relay connecting upon energization thereof said finder switch to said calling station; a receiving arrangement forming part of said register and receiving signals transmitted by said calling station; a first receiving relay; a second receiving relay; means for energizing said first receiving relay over said receiving arrangement when a first predetermined signal transmitted by said calling station is received by said receiving arrangement; means for energizing said second receiving relay over said receiving arrangement when a second predetermined signal transmitted by said calling station is received by said receiving arrangement; a register switch actuated by the energization of said receiving relays; a plurality of registering relays connected to said register switch, said registering relays being associated, respectively, with said called stations; second switch-over relays being energized, respectively, upon energization of said registering relays; means connected to said second switch-over relays for automatically calling, respectively, said stations of said plurality of stations for receiving the broadcast message transmitted by said calling station; a plurality of back-report relays connected, respectively, to said stations; means for energizing said back report relays, respectively, by said stations temporarily at the end of a broadcast message transmitted by said calling station; and means controlled, respectively, by said back-report relays for indicating at said calling station a good reception by said stations connected to said back-report relays, respectively, of the broadcast message transmitted by said calling station.

7. A telegraph system, comprising in combination, a calling station; a plurality of stations called by said calling station for receiving a broadcast message transmitted by said calling station; a combined receiving and transmitting printer arranged in each of said stations; a register for connecting said calling station to at least part of said plurality of stations called by said calling station for receiving the broadcast message; a finder switch forming part of the register and having a contact bank and a grounded wiper engaging the same; a switch-over relay connected to a contact of said bank so as to be energized when said contact of said bank of said finder switch engages said grounded wiper, said switch-over relay connecting upon energization thereof said finder switch to said calling station; a receiving arrangement forming part of said register and receiving signals transmitted by said calling station; a first receiving relay; a second receiving relay; means for energizing said first receiving relay over said receiving arrangement when a first predetermined signal transmitted by said calling station is received by said receiving arrangement; means for energizing said second receiving relay over said receiving arrangement when a second predetermined signal transmitted by said calling station is received by said receiving arrangement; a register switch actuated by the energization of said receiving relays; means connected to said register switch for automatically calling any station of said plurality of stations for receiving by said printers thereof the broadcast message transmitted by said printer of said calling station; a plurality of back-report relays connected, respectively, to said stations; means for energizing said back-report relays, respectively, by said stations temporarily at the end of a broadcast message transmitted by said calling station; and means controlled, respectively, by said back-report relays for indicating at said calling station a good reception by said stations connected to said back-report relays, respectively, of the broadcast message transmitted by said calling station.

8. A telegraph system, comprising in combination, a calling station; a plurality of stations called by said calling station for receiving a broadcast message transmitted by said calling station; a combined receiving and transmitting printer arranged in each of said stations; a register for connecting said calling station to at least part of said plurality of stations called by said calling station for receiving the broadcast message; a finder switch forming part of the register and having a contact bank and a grounded wiper engaging the same; a first switch-over relay connected to a contact of said bank so as to be energized when said contact of said bank of said finder switch engages said grounded wiper, said first switch-over relay connecting upon energization thereof said finder switch to said calling station; a receiving arrangement forming part of said register and receiving signals transmitted by said calling station; a first receiving relay; a second receiving relay; means for energizing said first receiving relay over said receiving arrangement when a first predetermined signal transmitted by said calling station is received by said receiving arrangement; means for energizing said second receiving relay over said receiving arrangement when a second predetermined signal transmitted by said calling station is received by said receiving arrangement; a register switch actuated by the energization of said receiving relays; a plurality of registering relays connected to said register switch, said registering relays being associated, respectively, with said called stations; second switch-over relays being energized, respectively, upon energization of said registering relays; means connected to said second switch-over relays for automatically calling, respectively, said stations of said plurality of stations for receiving by said printers thereof the broadcast message transmitted by said printer of said calling station; a plurality of back-report relays connected, respectively, to said stations; means for energizing said back-report relays, respectively, by said stations temporarily at the end of a broadcast message transmitted by said calling station; and means controlled, respectively, by said back-report relays for indicating at said calling station a good reception by said stations connected to said back-report relays, respectively, of the broadcast message transmitted by said calling station.

9. A telegraph system, comprising in combination, a calling station and a central station, said calling and central stations having telegraph transmitter and receiver apparatus arranged therein; a group of stations called by said calling station for receiving a broadcast message transmitted by said calling station; a broadcast register located in said central station for connecting said calling station to at least part of said group of stations called by said calling station for receiving the broadcast message; a finder switch forming part of said register and having a contact bank and a wiper engaging the same; a switch-over relay connected to a contact of said bank so as to be energized when said contact of said bank of said finder switch engages said wiper, said switch-over relay connecting upon energization thereof said finder switch to said calling station; receiver means located in said broadcast register for receiving signals transmitted by said calling station, said receiver means including a plurality of movable code rails, movable contacts attached, respectively, to said code rails, and stationary contacts cooperating, respectively, with said movable contacts; means for positioning said code rails, respectively, according to the code elements of a received signal, so that said cooperating contacts are closed and opened in combination, respectively, according to the code elements of the received signal; a first receiving relay; a second receiving relay; means for energizing said first receiving relay over a first predetermined combination of said contacts of said receiving arrangement when a first predetermined signal transmitted by said calling station is received by said receiver means; means for energizing said second receiving relay over a second predetermined combination of said contacts of said receiver means when a second predetermined signal transmitted by said calling station is received by said receiver means; a register switch actuated by the energization of said receiving relays; and means connected to said register switch for automatically calling any station of said group of stations for receiving the broadcast message transmitted by said calling station.

10. A telegraph system, comprising in combination, a calling station and a central station, said calling and central stations having telegraph transmitter and receiver apparatus arranged therein; a group of stations called by said calling station for receiving a broadcast message transmitted by said calling station; a broadcast register located in said central station for connecting said calling station to at least part of said group of stations called by said calling station for receiving the broadcast message; a finder switch forming part of said register and having a contact bank and a wiper engaging the same; a first switch-over relay connected to a contact of said bank so as to be energized when said contact of said bank of said finder switch engages said wiper, said first switch-over relay connecting upon energization thereof said finder switch to said calling station; receiver means forming part of said register for receiving signals transmitted by said calling station, said receiver means including a plurality of contacts, a first receiving relay; a second receiving relay; means for energizing said first receiving relay over a first predetermined combination of said plurality contacts of said receiver means when a first predetermined signal transmitted by said calling station is received by said receiver means; means for energizing said second receiving relay over a second predetermined combination of said plurality of contacts of said receiver means when a second predetermined signal transmitted by said calling station is received by said receiver means; a register switch common to said group of stations and actuated by the energization of said receiving relays; a plurality of registering relays connected to said register switch, said registering relays being associated, respectively, with said called stations; second switch-over relays being energized, respectively, upon energization of said registering relays; and means connected to said second switch-over relays for automatically calling, respectively, said stations of said group of stations for receiving the broadcast message transmitted by said calling station.

11. A telegraph system, comprising in combination, a group of stations and a central station; a combined receiving and transmitting apparatus arranged in each of said stations; a broadcast register located in said central station for connecting said calling station to at least part of said group of stations called by said calling station for receiving the broadcast message; a finder switch forming part of the register and having a contact bank and a wiper engaging the same; a switch-over relay connected to a contact of said bank so as to be energized when said contact of said bank of said finder switch engages said wiper, said switch-over relay connecting upon energization thereof said finder switch to said calling station; receiver means forming part of said broadcast register for receiving signals transmitted by said calling station, said receiver means including a plurality of contacts; a first receiving relay; a second receiving relay; means for energizing said first receiving relay over a first predetermined combination of said plurality of contacts of said receiver means when a first predetermined signal transmitted by said calling station is received by said receiver means; means for energizing said second receiving relay over a second predetermined combination of said plurality of contacts of said receiving arrangement when a second predetermined signal transmitted by said calling station is received by said receiver means; a register switch actuated by the energization of said receiving relays; and means connected to said register switch for automatically calling any station of said plurality of stations for receiving the broadcast message transmitted by said printer of said calling station.

12. A telegraph system, comprising in combination, a group of stations and a central station; a combined receiving and transmitting printer arranged in each of said stations; a broadcast register located in said central register for connecting said calling station to at least part of said group of stations called by said calling station for receiving the broadcast message; a finder switch forming part of the register and having a contact bank and a wiper engaging the same; a first switch-over relay connected to a contact of said bank so as to be energized when said contact of said bank of said finder switch engages said wiper, said first switch-over relay connecting upon energization thereof said finder switch to said calling station; a receiving arrangement forming part of said register and receiving signals transmitted by said calling station, said receiving arrangement including a plurality of movable code rails, movable contacts attached, respectively, to said code rails, and stationary contacts cooperating, respectively, with said movable contacts; means for positioning said code rails, respectively, according to the code elements of a received signal, so that said cooperating contacts are closed and opened in combinations, respectively, according to the code elements of the received signal; a first receiving relay; a second receiving relay; means for energizing said first receiving relay over a first pretermined combination of said contacts of said receiving arrangement when a first predetermined signal transmitted by said calling station is received by said receiving arrangement; means for energizing said second receiving relay over a second predetermined combination of said contacts of said receiving arrangement when a second predetermined signal transmitted by said calling station is received by said receiving arrangement; a register switch common to said group of stations and actuated by the energization of said receiving relays; a plurality of registering relays connected to said register switch, said registering relays being individually associated, respectively, with each of said stations forming said group of stations; second switch-over relays being energized, respectively, upon energization of said registering relays; and means connected to said second switch-over relays for automatically calling, respectively, said stations of said group of stations for receiving by said printers thereof the broadcast message transmitted by said printer of said calling station.

13. A telegraph system, comprising in combination, a calling station; a plurality of stations called by said calling station for receiving a broadcast message transmitted by said calling station; a register for connecting said calling station to at least part of said plurality of stations called by said calling station for receiving the broadcast message; a finder switch forming part of the register and having a contact bank and a grounded wiper engaging the same; a switch-over relay connected to a contact of said bank so as to be energized when said contact of said bank of said finder switch engages said grounded wiper, said switch-over relay connecting upon energization thereof said finder switch to said calling station; a receiving arrangement forming part of said register and receiving signals transmitted by said calling station, said receiving arrangement including a plurality of movable code rails, movable contacts attached, respectively, to said code rails, and stationary contacts co-operating, respectively, with said movable contacts; means for positioning said code rails, respectively, according to the code elements of a received signal, so that said co-operating contacts are closed and opened in combination, respectively, according to the code elements of the received signal; a first receiving relay; a second receiving relay; means for energizing said first receiving relay over a first predetermined combination of said contacts of said receiving arrangement when a first predetermined signal transmitted by said calling station is received by said receiving arrangement; means for energizing said second receiving relay over a second predetermined combination of said contacts of said receiving arrangement when a second predetermined signal transmitted by said calling station is received by said receiving arrangement; a register switch actuated by the energization of said receiving relays; means connected to said register switch for automatically calling any station of said plurality of stations for receiving the broadcast message transmitted by said calling station; a plurality of back-report relays connected, respectively, to said stations; means for energizing said back-report relays, respectively, by said stations temporarily at the end of a broadcast message transmitted by said calling station; and means controlled, respectively, by said back-report relays for indicating at said calling station a good reception by said stations connected to said back-report relays, respectively, of the broadcast message transmitted by said calling station.

14. A telegraph system, comprising in combination, a calling station; a plurality of stations called by said calling station for receiving a broadcast message transmitted by said calling station; a register for connecting said calling station to at least part of said plurality of stations called by said calling station for receiving the broadcast message; a finder switch forming part of the register and having a contact bank and a grounded wiper engaging the same; a first switch-over relay connected to a contact of said bank so as to be energized when said contact of said bank of said finder switch engages said grounded wiper, said first switch-over relay connecting upon energization thereof said finder switch to said calling station; a receiving arrangement forming part of said register and receiving signals transmitted by said calling station, said receiving arrangement including a plurality of movable code rails, movable contacts attached, respectively, to said code rails, and stationary contacts cooperating, respectively, with said movable contacts; means for positioning said code rails, respectively, according to the code elements of a received signal, so that said cooperating contacts are closed and opened in combinations, respectively, according to the code elements of the received signal; a first receiving relay; a second receiving relay; means for energizing said first receiving relay over a first predetermined combination of said contacts of said receiving arrangement when a first predetermined signal transmitted by said calling station is received by said receiving arrangement; means for energizing said second receiving relay over a second predetermined combination of said contacts of said receiving arrangement when a second predetermined signal transmitted by said calling station is received by said receiving arrangement; a register switch actuated by the energization of said receiving relays; a plurality of registering relays connected to said register switch, said registering relays being associated, respectively, with said called stations; second switch-over relays being energized, respectively, upon energization of said registering relays; means connected to said second switch-over relays for automatically calling, respectively, said stations of said plurality of stations for receiving the broadcast message transmitted by said calling station; a plurality of back-report relays connected, respectively, to said stations; means for energizing said back-report relays, respectively, by said stations temporarily at the end of a broadcast message transmitted by said calling station; and means controlled, respectively, by said back-report relays for indicating at said calling station a good reception by said stations connected to said back-report relays, respectively, of the broadcast message transmitted by said calling station.

15. A telegraph system, comprising in combination, a calling station; a plurality of stations called by said calling station for receiving a broadcast message transmitted by said calling station; a combined receiving and transmitting printer arranged in each of said stations; a register for connecting said calling station to at least part of said plurality of stations called by said calling station for receiving the broadcast message; a finder switch forming part of the register and having a contact bank and a grounded wiper engaging the same; a switch-over relay connected to a contact of said bank so as to be energized when said contact of said bank of said finder switch engages said grounded wiper, said switch-over relay connecting upon energization thereof said finder switch to said calling station; a receiving arrangement forming part of said register and receiving signals transmitted by said calling station, said receiving arrangement including a plurality of movable code rails, movable contacts attached, respectively, to said code rails, and stationary contacts cooperating, respectively, with said movable contacts; means for positioning said code rails, respectively, according to the code elements of a received signal, so that said cooperating contacts are closed and opened in combinations, respectively, according to the code elements of the received signal; a first receiving relay; a second receiving relay; means for energizing said first receiving relay over a first predetermined combination of said contacts of said receiving arrangement when a first predetermined signal transmitted by said calling station is received by said receiving arrangement; means for energizing said second receiving relay over a second predetermined combination of said contacts of said receiving arrangement when a second predetermined signal transmitted by said calling station is received by said receiving arrangement; a register switch actuated by the energization of said receiving relays; means connected to said register switch for automatically calling any station of said plurality of stations for receiving by said printers thereof the broadcast message transmitted by said printer of said calling station; a plurality of back-report relays connected, respectively, to said stations; means for energizing said back-report relays, respectively, by said stations temporarily at the end of a broadcast message transmitted by said calling station; and means controlled, respectively, by said back-report relays for indicating at said calling station a good reception by said stations connected to said back-report relays, respectively, of the broadcast message transmitted by said calling station.

16. A telegraph system, comprising in combination, a calling station; a plurality of stations called by said calling station for receiving a broadcast message transmitted by said calling station; a combined receiving and transmitting printer arranged in each of said stations; a register for connecting said calling station to at least part of said plurality of stations called by said calling station for receiving the broadcast message; a finder switch forming part of the register and having a contact bank and a grounded wiper engaging the same; a first switch-over relay connected to a contact of said bank so as to be energized when said contact of said bank of said finder switch engages said grounded wiper, said first switch-over relay connecting upon energization thereof said finder switch to said calling station; a receiving arrangement forming part of said register and receiving signals transmitted by said calling station, said receiving arrangement including a plurality of movable code rails, movable contacts attached, respectively, to said code rails, and stationary contacts cooperating, respectively, with said movable contacts; means for positioning said code rails, respectively, according to the code elements of a received signal, so that said cooperating contacts are closed and opened in combinations, respectively, according to the code elements of the received signal; a first receiving relay; a second receiving relay; means for energizing said first receiving relay over a first predetermined combination of said contacts of said receiving arrangement when a first predetermined signal transmitted by said calling station is received by said receiving arrangement; means for energizing said second receiving relay over a second predetermined combination of said contacts of said receiving arrangement when a second predetermined signal transmitted by said calling station is received by said receiving arrangement; a register switch actuated by the energization of said receiving relays; a plurality of registering relays connected to said register switch, said registering relays being associated, respectively, with said called stations; second switch-over relays being energized, respectively, upon energization of said registering relays; means connected to said second switch-over relays for automatically calling, respectively, said stations of said plurality of stations for receiving by said printers thereof the broadcast message transmitted by said printer of said calling station; a plurality of back-report relays connected, respectively, to said stations; means for energizing said back-report relays, respectively, by said stations temporarily at the end of a broadcast message transmitted by said calling station; and means controlled, respectively, by said back-report relays for indicating at said calling station a good reception by said stations connected to said back-report relays, respectively, of the broadcast message transmitted by said calling station.

17. A telegraph system, comprising in combination, a calling station and a central station, said calling and central stations having telegraph transmitter and receiver apparatus arranged therein; a group of stations called by said calling station for receiving a broadcast message transmitted by said calling station; a broadcast register located in said central stations for connecting said calling station to at least part of said group of stations called by said calling station for receiving the broadcast message; a finder switch forming part of the register and having a contact bank and a wiper engaging the same; a first switch-over relay connected to a contact of said bank so as to be energized when said contact of said bank of said finder switch engages said wiper, said first switch-over relay connecting upon energization thereof said finder switch to said calling station; receiver means forming part of said register for receiving signals transmitted by said calling station; a first receiving relay; a second receiving relay; means for energizing said first receiving relay over said receiver means when a first predetermined signal transmitted by said calling station is received by said receiver means; means for energizing said second receiving relay over said receiver means when a second predetermined signal transmitted by said calling station is received by said receiving arrangement; a register switch common to said group of stations and designed as a step-by-step switch having brushes actuated by the energization of said receiving relays, and contact banks cooperating, respectively, with said brushes; a plurality of registering relays connected to a contact of one of said banks of said register switch, said registering relays being individually associated, respectively, with each of said stations forming said group of stations; second switch-over relays being energized, respectively, upon energization of said registering relays; and means connected to said second switch-over relays for automatically calling, respectively, said stations of said group of stations for receiving the broadcast message transmitted by said calling station.

18. A telegraph system, comprising in combination, a calling station and a central station, said calling and central stations having telegraph transmitter and receiver apparatus arranged therein; a group of stations called by said calling station for receiving a broadcast message transmitted by said calling station; a broadcast register located in said central stations for connecting said calling station to at least part of said group of stations called by said calling station for receiving the broadcast message; a finder switch forming part of the register and having a contact bank and a wiper engaging the same; a first switch-over relay connected to a contact of said bank so as to be energized when said contact of said bank of said finder switch engages said wiper, said first switch-over relay connecting upon energization thereof said finder switch to said calling station; a receiving arrangement forming part of said register and receiving signals transmitted by said calling station, said receiving arrangement including a plurality of movable code rails, movable contacts attached, respectively, to said code rails, and stationary contacts cooperating, respectively, with said movable contacts; means for positioning said code rails, respectively, according to the code elements of a received signal, so that said cooperating contacts are closed and opened in combinations, respectively, according to the code elements of the received signal; a first receiving relay; a second receiving relay; means for energizing said first receiving relay over a first predetermined combination of said contacts of said receiving arrangement when a first predetermined signal transmitted by said calling station is received by said receiving arrangement; means for energizing said second receiving relay over a second predetermined combination of said contacts of said receiving arrangement when a second predetermined signal transmitted by said calling station is received by said receiving arrangement; a register switch common to said group of stations and designed as a step-by-step switch and having brushes actuated by the energization of said receiving relays, and contact banks cooperating, respectively, with said brushes; a plurality of registering relays connected to a contact of one of said banks of said register switch, said registering relays being individually associated, respectively, with each of said stations forming said group of stations; second switch-over relays being energized, respectively, upon energization of said registering relays; and means connected to said second switch-over relays for automatically calling, respectively, said stations of said group of stations for receiving the broadcast message transmitted by said calling station.

19. A telegraph system, comprising in combination, a group of stations and a central station; a combined receiving and transmitting printer arranged in each of said group of stations and in said central station; a broadcast register located in said central register for connecting said calling station to at least part of said group of stations called by said calling station for receiving the broadcast message; a finder switch forming part of the register and having a contact bank and a wiper engaging the same; a first switch-over relay connected to a contact of said bank so as to be energized when said contact of said bank of said finder switch engages said wiper, said first switch-over relay connecting upon energization thereof said finder switch to said calling station; a receiving arrangement forming part of said register and receiving signals transmitted by said calling station, said receiving arrangement including a plurality of movable code rails, movable contacts attached, respectively, to said code rails, and stationary contacts cooperating, respectively, with said movable contacts; means for positioning said code rails, respectively, according to the code elements of a received signal, so that said cooperating contacts are closed and opened in combinations, respectively, according to the code elements of the received signal; a first receiving relay; a second receiving relay; means for energizing said first receiving relay over a first predetermined combination of said contacts of said receiving arrangement when a first predetermined signal transmitted by said calling station is received by said receiving arrangement; means for energizing said second receiving relay over a second predetermined combination of said contacts of said receiving arrangement when a second predetermined signal transmitted by said calling station is received by said receiving arrangement; a register switch common to said group of stations and designed as a step-by-step switch and having brushes actuated by the energization of said receiving relays, and contact banks cooperating, respectively, with said brushes; a plurality of registering relays connected to a contact of one of said banks of said register switch, said registering relays being individually associated, respectively, with each of said stations forming said group of stations; second switch-over relays being energized, respectively, upon energization of said registering relays; and means connected to said second switch-over relays for automatically calling, respectively, said stations of said group of stations for receiving by said printers thereof the broadcast message transmitted by said printer of said calling station.

20. A telegraph system, comprising in combination, a calling station; a plurality of stations called by said calling station for receiving a broadcast message transmitted by said calling station; a combined receiving and transmitting printer arranged in each of said stations; a register for connecting said calling station to at least part of said plurality of stations called by said calling station for receiving the broadcast message; a finder switch forming part of the register and having a contact bank and a grounded wiper engaging the same; a first switch-over relay connected to a contact of said bank so as to be energized when said contact of said bank of said finder switch engages said grounded wiper, said first switch-over relay connecting upon energization thereof said finder switch to said calling station; a receiving arrangement forming part of said register and receiving signals transmitted by said calling station, said receiving arrangement including a plurality of movable code rails, movable contacts attached, respectively, to said code rails, and stationary contacts cooperating, respectively, with said movable contacts; means for positioning said code rails, respectively, according to the code elements of a received signal, so that said cooperating contacts are closed and opened in combinations, respectively, according to the code elements of the received signal; a first receiving relay; a second receiving relay; means for energizing said first receiving relay over a first predetermined combination of said contacts of said receiving arrangement when a first predetermined signal transmitted by said calling station is received by said receiving arrangement; means for energizing said second receiving relay over a second predetermined combination of said contacts of said receiving arrangement when a second predetermined signal transmitted by said calling station is received by said receiving arrangement; a register switch designed as a step-by-step switch and having brushes actuated by the energization of said receiving relays, and contact banks cooperating, respectively, with said brushes; a plurality of registering relays connected to a contact of one of said banks of said register switch, said registering relays being associated, respectively, with said called stations; second switch-over relays being energized, respectively, upon energization of said registering relays; means connected to said second switch-over relays for automatically calling, respectively, said stations of said plurality of stations for receiving by said printers thereof the broadcast message transmitted by said printer of said calling station; a plurality of back-report relays connected, respectively, to said stations; means for energizing said back-report relays, respectively, by said stations temporarily at the end of a broadcast message transmitted by said calling station; and means controlled, respectively, by said back-report relays for indicating at said calling station a good reception by said stations connected to said back-report relays, respectively, of the broadcast message transmitted by said calling station.

21. In a telegraph system a broadcast arrangement comprising stations arranged in groups and a central station; a telegraph transmitter and receiver apparatus located in said station; a broadcast register arranged in said central station; selecting switches for connecting said broadcast register to any calling station and for engaging the same; receiver means located in said broadcast register for operating either a first or a second receiving relay upon reception of either a first or a second predetermined signal transmitted by the calling station; a sequence switch which leads the various switching operations in the broadcast in right succession; transmitting means located in said broadcast register for transmitting informative signals to the calling station; a first and a second digit switch located in said broadcast register, contacts of said switches applying the necessary code elements for said informative signals to said transmitting means; register relays individual to all stations belonging to the same group; a step by step switch located in said broadcast register provided with first and second contact banks contacts of which correspond with the group numerals of the various stations belonging to the same group; control circuits connected at the contacts of first contact banks of said step by step switch controlling the operation of said first and said second switch so as to furnish code elements to said transmitting means which represent said group numerals; operating circuits for said register relays including a contact of said first receiving relay, the wipers of the second contact banks of said step by step switch, and connections between the contact thereof and the register relays which have corresponding group numerals, so that said register relays can be operated in consequence of the transmission of the first predetermined signal by the following station, in answer to the transmission of the group numeral of the relevant register relay by said transmitting means; holding circuits individual to said register relays, over which operated register relays remain energized; switch over relays individual to the stations belonging to the same group, operated under the control of jointly said register relays and the sequence switch in one of its positions; repeater means located in said broadcast register; loop repeater relays individual to all stations; contacts of said switch over relays for connecting the windings of said loop repeater relays to said repeating means upon operation of said switch over relays, thus enabling the relevant stations to receive a broadcast message, be transmitted by said calling station.

22. In a telegraph system a broadcast arrangement comprising stations arranged in groups and a central station; telegraph transmitter and receiver apparatus located in each of said stations arranged in groups; a broadcast register arranged in said central station; selecting switches located in said broadcast register and connecting said broadcast register to a calling station; a second receiving relay; receiver means located in said broadcast register for operating said first and second receiving relays upon reception of a first and second predetermined signal, respectively, transmitted by the calling station; sequence switch means for switching the operations in said broadcast register in a predetermined sequence; transmitting means located in said broadcast register for transmitting informative signals to the calling station; a first and a second digit switch located in said broadcast register and having contacts for applying the necessary code for said informative electrical signals to said transmitting means; register relays common to all stations making up the same group; a step by step switch located in said broadcast register and having first and second contact banks, the contacts of which correspond with the various group numerals of the various stations belonging to the same group; control circuits connected to the contacts of said first contact bank of said step-by-step switch, said control circuits controlling the operations of said first and second digit switch so as to furnish electrical code signals to said transmitting means which represent said group numerals; operating circuits for said register relays, said circuits including a contact of said first receiving relay, the wipers of the second contact banks of said step-by-step switch, and connections between the contacts of said second contact banks and the register relays which have corresponding group numerals, so that said register relays can be operated as a result of the transmission of the first predetermined signal by the calling station in answer to the transmission of the group numeral of the relevant register relay by said transmitting means; individual holding circuits for each of said register relays for maintaining said register relays energized once they have been energized; repeater means located in said broadcast register; loop repeater relays being equal in number to said stations forming said group of stations; and switch over relays having contacts, said switch over relays being individual to the stations belonging to the same group and operated under the control of both said register relays and said sequence switch in one of its positions, said contacts of said switch over relay connecting the windings of said loop repeater relays to said repeater means upon operation of said switch over relays, thus enabling the relevant stations to receive a broadcast message to be transmitted by said calling station.

23. In a telegraph system a broadcast arrangement comprising stations arranged in groups and a central station; telegraph transmitter and receiver apparatus located in each of said stations arranged in groups; a broadcast register arranged in said central station; selecting switches located in said broadcast register and connecting said broadcast register to a calling station; a second receiving relay; receiver means located in said broadcast register for operating said first and second receiving relays upon reception of a first and second predetermined signal, respectively, transmitted by the calling station; sequence switch means for switching the operation in said broadcast register in a predetermined sequence; transmitting means located in said broadcast register for transmitting informative signals to the calling station; register relays common to all stations making up the same group; a step by step switch located in said broadcast register and having first and second contact banks, the contacts of which correspond with the various group numerals of the various stations belonging to the same group; control circuits connected to the contacts of said first contact bank of said step-by-step switch; operating circuits for said register relays, said circuits including a contact of said first receiving relay, the wipers of the second contact banks of said step-by-step switch, and connections between the contacts of said second contact banks and the register relays which have corresponding group numerals, so that said register relays can be operated as a result of the transmission of the first predetermined signal by the calling station in answer to the transmission of the group numeral of the relevant register relay by said transmitting means; individual holding circuits for each of said register relays for maintaining said register relays energized once they have been energized; repeater means located in said broadcast register; loop repeater relays being equal in number to said stations forming said group of stations; and switch over relays having contacts, said switch over relays being individual to the stations belonging to the same group and operated under the control of both said register relays and said sequence switch in one of its positions, said contacts of said switch over relay connecting the windings of said loop repeater relays to said repeater means upon operation of said switch over relays, thus enabling the relevant stations to receive a broadcast message to be transmitted by said calling station.

24. In a telegraph system a broadcast arrangement comprising stations arranged in groups and a central station; telegraph transmitter and receiver apparatus located in each of said stations arranged in groups; a broadcast register arranged in said central stations; selecting switches located in said broadcast register and connecting said broadcast register to a calling station; a second receiving relay; receiver means located in said broadcast register for operating said first and second receiving relays upon reception of a first and second predetermined signal, respectively, transmitted by the calling station; sequence switch means for switching the operation in said broadcast register in a predetermined sequence; transmitting means located in said broadcast register for transmitting informative signals to the calling station; register relays common to all stations making up the same group; a step-by-step switch located in said broadcast register and having first and second contact banks, the contacts of which correspond with the various group numerals of the various stations belonging to the same group; control circuits connected to the contacts of said first contact bank of said step-by-step switch; operating circuits for said register relays, said circuits including a contact of said first receiving relay, the wipers of the second contact banks of said step-by-step switch, and connections between the contacts of said second contact banks and the register relays which have corresponding group numerals, so that said register relays can be operated as a result of the transmission of the first predetermined signal by the calling station in answer to the transmission of the group numeral of the relevant register relay by said transmitting means; repeater means located in said broadcast register; loop repeater relays being equal in number to said stations forming said group of stations; and switch over relays having contacts, said switch over relays being individual to the stations belonging to the same group and operated under the control of both said register relays and said sequence switch in one of its positions, said contacts of said switch over relay connecting the windings of said loop repeater relays to said repeater means upon operation of said switch over relays, thus enabling the relevant stations to receive a broadcast message to be transmitted by said calling station.

25. In a telegraph system a broadcast arrangement comprising stations arranged in groups and a central station; telegraph transmitter and receiver apparatus located in each of said stations arranged in groups; a broadcast register arranged in said central station; selecting switches located in said broadcast register and connecting said broadcast register to a calling station; a second receiving relay; receiver means located in said broadcast register for operating said first and second receiving relays upon reception of a first and second predetermined signal, respectively, transmitted by the calling station; sequence switch means for switching the operations in said broadcast register in a predetermined sequence; transmitting means located in said broadcast register for transmitting informative signals to the calling station; a first and a second digit switch located in said broadcast register and having contacts for applying the necessary code for said informative electrical signals to said transmitting means; register relays common to all stations making up the same group; a step-by-step switch located in said broadcast register and having first and second contact banks, the contacts of which correspond with the various group numerals of the various stations belonging to the same group; control circuits connected to the contacts of said first contact bank of said step-by-step switch, said control circuits controlling the operations of said first and second digit switch so as to furnish electrical code signals to said transmitting means which represent said group numerals; operating circuits for said register relays, said circuits including a contact of said first receiving relay, the wipers of the second contact banks of said step-by-step switch, and connections between the contacts of said second contact banks and the register relays which have corresponding group numerals, so that said register relays can be operated as a result of the transmission of the first predetermined signal by the calling station in answer to the transmission of the group numeral of the relevant register relay by said transmitting means; individual holding circuits for each of said register relays for maintaining said register relays energized once they have been energized; repeater means located in said broadcast register; loop repeater relays being equal in number to said stations forming said group of stations; and switch over relays having contacts, said switch over relays belonging to the same group and operated under the control of both said register relays and said sequence switch in one of its positions, said contacts of said switch over relay connecting the windings of said loop repeater relays to said repeater means upon operation of said switch over relays, thus enabling the relevant stations to receive a broadcast message to be transmitted by said calling station.

ROELOF M. M. OBERMAN.

References Cited in the file of this patent

UNITED STATES PATENTS

| Number | Name | Date |
|---|---|---|
| 2,073,236 | Potts | Mar. 9, 1937 |
| 2,132,684 | Gardner | Oct. 11, 1938 |
| 2,361,342 | Willis | Oct. 24, 1944 |